US 6,751,705 B1

(12) United States Patent
Solomon et al.

(10) Patent No.: US 6,751,705 B1
(45) Date of Patent: Jun. 15, 2004

(54) CACHE LINE CONVERTER

(75) Inventors: Doug Solomon, Los Altos, CA (US);
David M. Perry, San Jose, CA (US);
Givargis G. Kaldani, Los Gatos, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 363 days.

(21) Appl. No.: 09/650,101

(22) Filed: Aug. 25, 2000

(51) Int. Cl.[7] .............................................. G06F 12/08
(52) U.S. Cl. ........................ 711/122; 711/120; 711/124; 711/138
(58) Field of Search ................................. 711/118, 119, 711/120, 122, 121, 138, 135, 141, 145, 146, 133, 130, 124

(56) References Cited

U.S. PATENT DOCUMENTS

| 6,314,491 | B1 | * | 11/2001 | Freerksen et al. | ........... | 711/124 |
| 6,314,498 | B1 | * | 11/2001 | Arimilli et al. | ............. | 711/144 |
| 6,360,301 | B1 | * | 3/2002 | Gaither et al. | .............. | 711/143 |
| 6,397,302 | B1 | * | 5/2002 | Razdan et al. | ............... | 711/141 |
| 6,415,362 | B1 | * | 7/2002 | Hardage et al. | ............ | 711/142 |
| 6,493,801 | B2 | * | 12/2002 | Steely et al. | ................ | 711/135 |

* cited by examiner

*Primary Examiner*—Pierre-Michel Bataille
(74) *Attorney, Agent, or Firm*—Schwegman, Lundberg, Woessner & Kluth, P.A.

(57) ABSTRACT

A method and apparatus for purging data from a middle cache level without purging the corresponding data from a lower cache level (i.e., a cache level closer to the processor using the data), and replacing the purged first data with other data of a different memory address than the purged first data, while leaving the data of the first cache line in the lower cache level. In some embodiments, in order to allow such mid-level purging, the first cache line must be in the "shared state" that allows reading of the data, but does not permit modifications to the data (i.e., modifications that would have to be written back to memory). If it is desired to modify the data, a directory facility will issue a purge to all caches of the shared-state data for that cache line, and then the processor that wants to modify the data will request an exclusive-state copy to be fetched to its lower-level cache and to all intervening levels of cache. Later, when the data in the lower cache level is modified, the modified data can be moved back to the original memory from the caches. In some embodiments, a purge of all shared-state copies of the first cache-line data from any and all caches having copies thereof is performed as a prerequisite to doing this exclusive-state fetch. Also described is a method and apparatus for converting from a system-level cache line (e.g., in one embodiment, a 128-byte directory-based cache coherence model) to a different processor-level cache line (e.g., in one embodiment, a 64-byte, snoop-based cache-coherence model).

18 Claims, 13 Drawing Sheets

SYNERGY UNCACHED ADDRESS MAP

| SYNERGY ADDRESS | | BEDROCK ADDRESS | | |
|---|---|---|---|---|
| 16 T MINUS 1 BYTE (1T) 15T | RESERVED | | | |
| 15 T MINUS 1 BYTE (1T) 14T | SSPEC | | | |
| 14 T MINUS 1 BYTE (1T) 13T | RESERVED | | | |
| 13 T MINUS 1 BYTE (1T) 12T | UNCAC | UNCAC | 1 T MINUS 1 BYTE 0T | (ATTR=3) |
| 12 T MINUS 1 BYTE (1T) 11T | HSPEG | HSPEG | 1 T MINUS 1 BYTE 0T | (ATTR=0) |
| 11 T MINUS 1 BYTE (1T) 10T | IOSPEC | IOSPEC | 1 T MINUS 1 BYTE 0T | (ATTR=1) |
| 10 T MINUS 1 BYTE (1T) 9T | MSPEC | MSPEC | 1 T MINUS 1 BYTE 0T | (ATTR=2) |
| 9 T MINUS 1 BYTE (1T) 8T | UNCAC | UNCAC | 1 T MINUS 1 BYTE 0T | (ATTR=3) |
| 8 T MINUS 1 BYTE (1T) 7T | RESERVED | | | |
| 7 T MINUS 1 BYTE (1T) 6T | SSPEC | | | |
| 6 T MINUS 1 BYTE (1T) 15T | RESERVED | | | |
| 5 T MINUS 1 BYTE (1T) 4T | UNCAC | UNCAC | 1 T MINUS 1 BYTE 0T | (ATTR=3) |
| 4 T MINUS 1 BYTE (1T) 3T | HSPEC | HSPEC | 1 T MINUS 1 BYTE 0T | (ATTR=0) |
| 3 T MINUS 1 BYTE (1T) 2T | IOSPEC | IOSPEC | 1 T MINUS 1 BYTE 0T | (ATTR=1) |
| 2 T MINUS 1 BYTE (1T) 1T | MSPEC | MSPEC | 1 T MINUS 1 BYTE 0T | (ATTR=2) |
| 1 T MINUS 1 BYTE (1T) 0T | UNCAC | UNCAC | 1 T MINUS 1 BYTE 0T | (ATTR=3) |

Rows 9T–13T: INVERSE SWIZZLING POLARITY
Rows 1T–5T: INVERSE SWIZZLING POLARITY

FIG. 3

| FSB REQUEST TYPE | GCE DETERMINES RESPONSE | GENERATE AS MATER | PASS TO GCE |
|---|---|---|---|
| DEFERRED REPLY | n | y | y |
| INTERRUPT ACK | n | n | n -- STATUS PULSE (ERROR) |
| SHUTDOWN | n | n | n -- STATUS PULSE |
| FLUSH (INVD) | n | y | y |
| HALT | n | n | n -- STATUS PULSE |
| SYNC (WBINVD) | n | n | n -- STATUS PULSE |
| FLUSH ACK | n | n | n -- COUNTED AS PART OF FLUSH OP |
| xTPR | n | n | n -- STATUS PULSE (ERROR) |
| INTERRUPT | n | y | y |
| PURGE TC | n | y | y |
| I/O READ | y | n | n |
| I/O WRITE | y | n | n |
| MEMORY READ & INV | y | y* | y |
| MEMORY READ | y | y* | y |
| MEMORY WRITE | y | n | n |
| ALL RESERVED | n | n | n -- STATUS PULSE (ERROR) |

\* -- INVALIDATES AND INTERVENTIONS

FIG. 6

| INCOMING TRANSACTION | REORDER REGISTER | ACTION |
|---|---|---|
| 8-BYTE WC | CLOSED | ALLOCATE FREE DATA BUFFER AND WRITE 8-BYTE DATA<br>OPEN RR AND SET DATA VALID BIT |
| | OPEN HIT | WRITE DATA IN DATA BUFFER<br>SET DATA VALID BIT IN RR<br>ISSUED UWACK |
| | OPEN MISS | PLACE WC ENTRY IN ADDRESS FIFO WITH RR ADDRESS/ VALID BITS<br>CLOSE RR<br>ALLOCATE FREE DATA BUFFER AND WRITE DATA<br>OPEN RR AND SET DATA VALID BIT |
| 64-BYTE WC | CLOSED | ALLOCATE FREE DATA BUFFER AND WRITE 64-BYTE DATA<br>PLACE WC ENTRY IN ADDRESS FIFO WILL ALL DATA VALID |
| | OPEN | PLACE WC ENTRY IN ADDRESS FIFO WITH RR ADDRESS/ VALID BITS<br>CLOSE RR<br>ALLOCATE FREE DATA BUFFER AND WRITE 64-BYTE DATA<br>PLACE WC ENTRY IN ADDRESS FIFO WILL ALL DATA VALID |
| 8-BYTE UC | CLOSED | ALLOCATE FREE UC DATA BUFFER<br>PLACE UC ENTRY IN ADDRESS FIFO |
| | OPEN | PLACE WC ENTRY IN ADDRESS FIFO WITH RR ADDRESS/ VALID BITS<br>CLOSE RR<br>ALLOCATE FREE UC DATA BUFFER<br>PLACE UC ENTRY IN ADDRESS FIFO |

FIG. 12

| ERROR INTERRUPT | ERROR INTERRUPT | ERROR INTERRUPT | ERROR INTERRUPT |
|---|---|---|---|
| PARITY ERROR ON INCOMING SYSCMD BUS | ADDRESS CYCLE OF INTERRUPT | YES | SI WILL DISCARD REQUEST |
| | ADDRESS CYCLE OF INVALIDATE OR INTERVENTION | YES | SI WILL DISCARD REQUEST |
| | 1ST DATA CYCLE | YES | SI WILL DISCARD RESPONSE |
| | 2ND + DATA CYCLE | YES | |
| CORRECTABLE ERROR ON INCOMING SYSAD BUS | ADDRESS OR DATA CYCLE AND SYSCMD OK | YES | CORRECT AND CONTINUE |
| UNCORRECTABLE ERROR ON INCOMING SYSAD BUS | ADDRESS CYCLE AND SYSCMD OK | YES | SI WILL DISCARD REQUEST |
| | 1ST DATA CYCLE AND SYSCMD OK | YES | SI WILL SET BAD DATA INDICATOR IN DATA RESPONSE BUFFER |
| | 2ND + DATA CYCLE | YES | |
| PARITY ERROR ON INCOMING SYSRESP BUS | | YES | SI WILL DISCARD RESPONSE |

FIG. 13

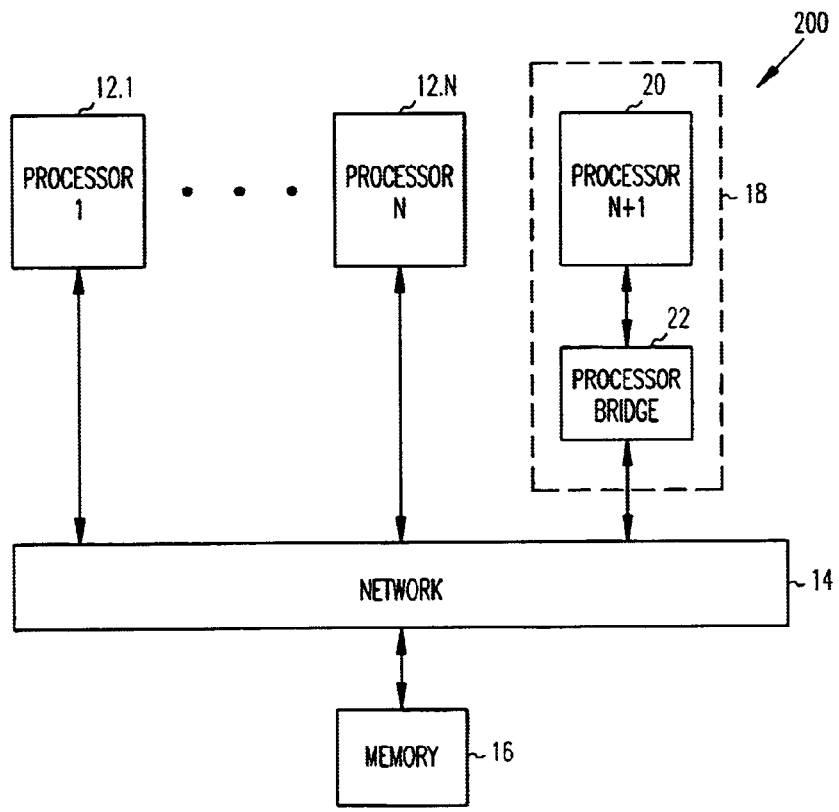

FIG. 14

CACHE LINE CONVERTER

CROSS-REFERENCE TO RELATED APPLICATIONS

This application is related to:

a U.S. Patent Application entitled "DRAM MICROPROCESSOR CACHE WITH ON-CHIP TAGS," Ser. No. 09/652,797, filed on Aug. 31, 2000;
a U.S. Patent Application entitled "METHOD AND CACHE-COHERENCE SYSTEM ALLOWING PURGING OF MID-LEVEL CACHE ENTRIES WITHOUT PURGING LOWER-LEVEL CACHE ENTRIES," Ser. No. 09/650,100, filed on Aug. 25, 2000 and
a U.S. Patent application entitled "MULTIPROCESSOR NODE CONTROLLER CIRCUIT AND METHOD," Ser. No. 09/407,428 filed on Sep. 29, 1999, each incorporated herein by reference.

FIELD OF THE INVENTION

This invention relates generally to computer cache memories, and more particularly to a cache-coherence system and a method for converting cache line types from a first type used on a multiprocessor system portion and a second cache line type used at each processor.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2000, Silicon Graphics Incorporated, All Rights Reserved.

BACKGROUND OF THE INVENTION

Parallel computer systems provide economic, scalable, and high-availability approaches to computing solutions. From the point of view of managing computer systems including parallel-processor systems, there is a need for a cache coherence system and control in order to obtain desired system operation.

Conventional hierarchical cache systems provide small fast cache memories next to fast information processing units, and larger slower memories that are further away in time and space. It is too expensive to make a fast memory large enough to hold all of the data for a large computer program, and when memories are made larger, the access times slow down and heat dissipation also becomes a problem.

Modem computer systems thus typically include a hierarchy of memory systems. For example, a processor might have an L0 cache on the same chip as a processor. This L0 cache is the smallest, perhaps 16 to 256 kilobytes (KB), and runs at the fastest speed since there are no chip-boundary crossings. An L1 cache might be placed next to the processor chip on the same chip carrier. This L1 cache is the next smallest, perhaps 0.5 to 8 megabytes (MB), and runs at the next fastest speed since there are chip-boundary crossings but no card-boundary crossings. An L2 cache, if implemented, might be placed next to the processor card in the same box but on a different chip carrier. This L2 cache is typically still larger than the L1 and runs at the next fastest speed since there are card-boundary crossings but no box-boundary crossings. A large main memory, typically implemented using RDRAMs (RAMBUS™ dynamic random-access memories) or DDR SDRAMs (double-data-rate synchronous dynamic random-access memories) is then typically provided. Beyond that, a disc array provides mass storage at a slower speed than main memory, and a tape farm can even be provided to hold truly enormous amounts of data, accessible within seconds, minutes or hours. At each level moving further from the processor, there is typically a larger store running at a slower speed. For each level of storage, the level closer to the processor thus contains a proper subset of the data in the level further away. For example, in order to purge data in the main memory leaving that data only in the disc storage, one must first purge all of the portions of that data that may reside in the L0, L1, and/or L2 levels of cache. Conventionally, this may not lead to any performance problems, since the processor is finished with the data by the time that the main memory is purged.

However, as more processors and more caches are added to a system, there can be more competition for scarce cache resources. There is a need to maintain coherence of data (i.e., ensuring that as data is modified, that all cached copies are timely and properly updated) among the various cache types, levels, and locations. Thus there is a need for improved methods and apparatus to improve system performance while also maintaining system integrity and cache coherence.

SUMMARY OF THE INVENTION

The present invention provides solutions to the above-described shortcomings in conventional approaches, as well as other advantages apparent from the description and appendices below.

The present invention provides a method and apparatus for converting from a system-level cache line (e.g., in one embodiment, a (128)-byte directory-based cache coherence model) to a different processor-level cache line (e.g., in one embodiment, a (64)-byte, snoop-based cache-coherence model).

BRIEF DESCRIPTION OF THE DRAWINGS

FIG. 3 shows an address map 300 used by one embodiment of the present invention.

FIG. 6 shows a table 600 of request types.

FIG. 12 shows a table of actions versus incoming transactions 1200.

FIG. 13 shows a table of SI detected SysAD errors 1300.

FIG. 14 shows an embodiment of the present invention, a multiprocessor computer system 200.

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Figure 1:
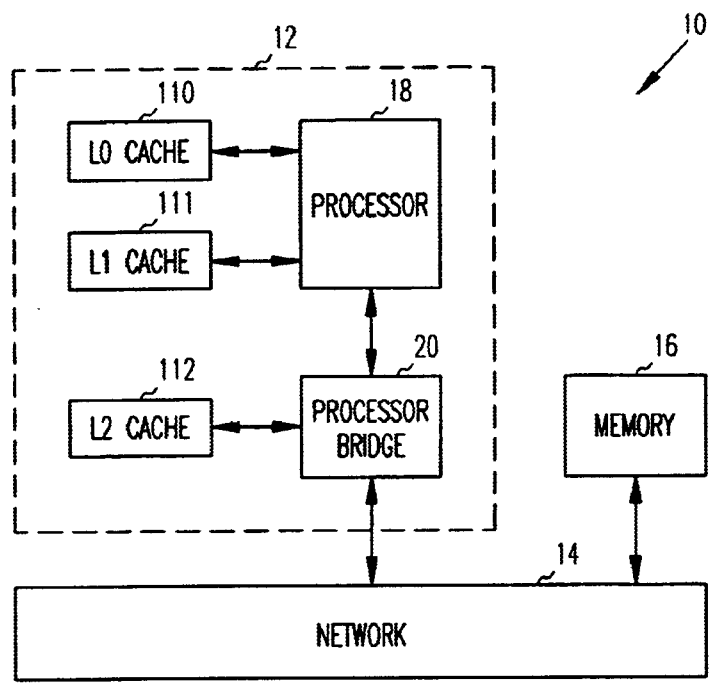
FIG. 1 shows an embodiment of the present invention, a computer system 100.

A computer system 10 in which a microprocessor is retrofitted into a system designed for another microprocessor is shown in FIG. 1. System 10 includes a processor node 12 connected across a network 14 to memory 16. Processor node 12 includes a processor 18 (i.e., the new processor) and processor bridge logic 20.

In some embodiments, processor 18 includes one or more caches (e.g., in one embodiment, level 0 cache 110 and level 1 cache 111), and processor bridge logic 20 includes one or more caches (e.g., in one embodiment, level 2 cache 112). Memory 16 may be a single large memory, or may be distributed as a plurality of smaller memories. In some embodiments, level 0 cache 110 is "on-chip" cache placed on the same chip as the main microprocessor (i.e., processor 18), while level 1 cache 111 is on a separate chip, but in the same module as the main microprocessor. Processor 18 performs read and write operations, typically viewed as operating on or "accessing" data stored in memory 16. Upon an access request, a system cache line (e.g., in one embodiment, a cache line is one hundred twenty-eight (128) bytes) is transferred from memory 16 into level 2 cache 112. In some embodiments, processor 18 has a smaller cache line size (e.g., sixty-four (64) bytes, in one embodiment), and thus a processor cache line (of 64 bytes) is transferred into level 1 cache 111. In some embodiments, yet another level of cache (level 0 cache 110) is also provided. In some embodiments, two or more processors 18, each having their own cache(s) are connected to a single processor bridge 20. In some such embodiments, the processors 18 use a snoop-based protocol to maintain cache coherence among themselves, but processor bridge 20 and memory 16 use a directory-based cache coherence scheme.

In some embodiments, caches data is marked as being in one of four MESI states: modified state, exclusive state, shared state, or invalid state. Read-write data is either exclusive state or modified state. Exclusive-state data is read-write data when none of the cache line is yet modified (such data need not ne written back when clean-up is done, since the copy in memory is the same as that in cache), and modified-state is such a cache line once it has been modified (also called a "dirty" cache line, since it must be written back into memory). Only one processor is allowed to have a copy of a particular cache line when it is marked as exclusive-state or modified-state data. When a cache line is purged, that line is marked as invalid state. Shared-state data is considered to be read-only, and a plurality of separate processors and caches can have copies, and no modifications will be written back into memory (in some embodiments, processors may modify their copy of shared, but any modified data is not written back to main memory).

In some embodiments, this allows the purging of shared-state data in the L2 cache 112 once the data requested by processor 18 has been copied into L1 cache 111, since the directory "knows" the data is being used by processor 18 (i.e., the directory can track which processors have copies, or can track the fact that "some" processor has a copy without knowing which processor, and the directory will need send a purge command to invalidate such copies at a later time), and a copy of the relevant data is still in the L1 cache 111. This allows the L2 cache 112 to be freed up to get and hold other cached data into that same cache line space to be used by one of the attached processors 18 (e.g., for the L1 cache of the other processor 18). If the cached data of the first processor is to be changed, then the processor must first get exclusivity to that data by purging all other shared copies (a cache purge request can be sent to every processor in the system by the directory, that will in turn perform local front-side bus purge operations to clear all the caches of such shared-state cache copies of data), and requesting an exclusive copy of the data for that processor to modify. The changed data will be written back up the chain (i.e., from the L0 to the L1, and from the L1 to the L2, and from the L2 to the memory. Since, in one embodiment, the processor cache line size is (64) bytes, and the system line size is (128) bytes (i.e., when a cache line is written back to memory 16 from L2 cache 112, (128) bytes are always written), the original (128)-byte system cache line is again fetched from the memory 16 into the L2 cache 112, half is overwritten with the (64) bytes being moved out of the L1 cache 111, and then the changed (128) bytes is written back to memory 16. This frees the (64)-byte cache line in L1 cache 111 and the (128)-byte cache line in L2 cache 112 for other uses.

Figure 2:
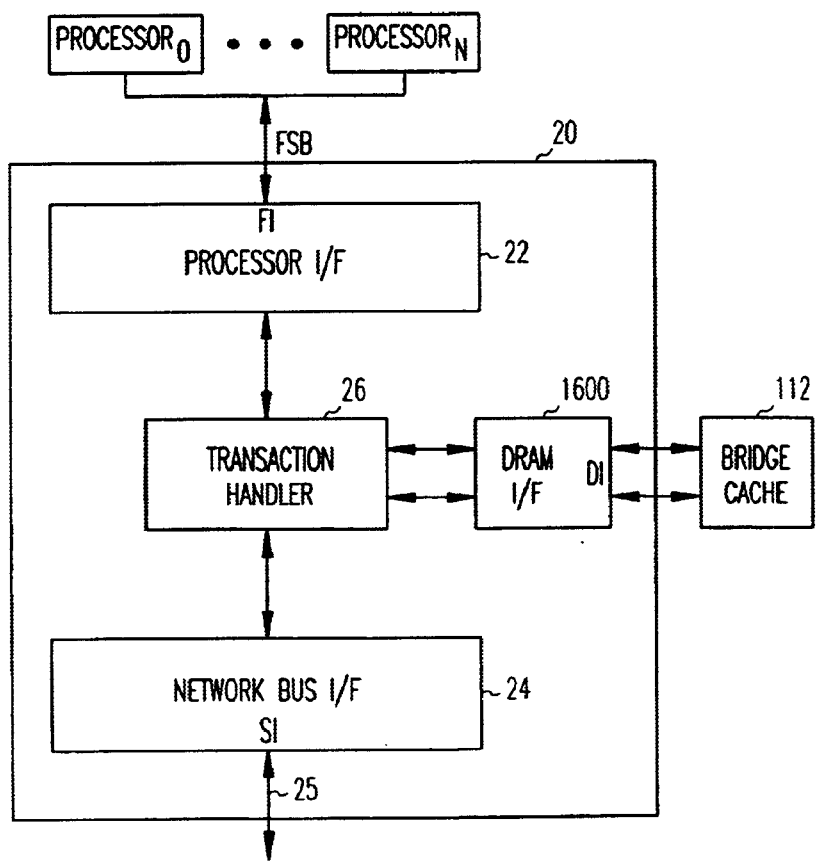
FIG. 2 shows an embodiment of the present invention, a processor bridge 20.

In one embodiment, (as is shown in FIG. 2), processor bridge logic 20 includes a processor interface 22 designed for the new processor (in one embodiment, the processor bus is called the front-side bus (FSB), and this interface is called the FSB interface (FI)), a bus interface 24 which emulates the bus interface of original processor (in one embodiment, the network bus is called the system-side bus (SB), and this interface is called the SB interface (SI)), a transaction handler 26, and a DRAM interface (DI) 1600 connected to a bridge cache 112. In some embodiments, bridge cache 112 of FIG. 2 is the same as, or is used as, level 2 cache 112 of FIG. 1. DI 1600 is further described in copending and commonly assigned application Ser. No. 09/650,100, entitled "METHOD AND CACHE-COHERENCE SYSTEM ALLOWING PURGING OF MID-LEVEL CACHE ENTRIES WITHOUT PURGING LOWER-LEVEL CACHE ENTRIES" filed on even date herewith, the description of which is incorporated by reference.

Processor interface 22 is capable of receiving memory requests from the new processor and of passing the request to transaction handler 26. Transaction handler 26 receives memory requests from processor interface 22 and transfers the memory requests to memory 16 via bus interface 24. Bridge cache 112 stores data received as a result of a memory request to an address and provides the stored data in response to future memory requests from processor interface 22 to the same address.

Bridge cache 112 acts as a buffer between the transaction regime of the new processor and the transaction regime of the original processor. Bridge cache 112 also provides a fast local copy of a portion of memory to compensate for the fact that the latency to local system memory has effectively increased as a result of the interposing of processor bridge logic 20 as a bus converter.

As noted above, a system which simply interposes a bus converter between the existing structure and the new processor incurs a performance penalty due to the increased latency of the bus converter. By adding a bridge cache 112 of sufficient size, however, system 10 should actually see better performance. That is, the reduced latency of memory requests serviced through cache 112 offsets the increased latency of logic 20.

In addition, by providing bridge cache 112, one can now handle the situation where the cache line size of the new processor is less than the cache line size of system 10. When system 10 returns a cache line, it will be the size of a system 10 cache line. Only a portion of the cache line can be stored to processor 18. The remainder must either be saved in a different storage mechanism, or discarded. (It is usually not possible to write the remaining data directly into processor cache.)

Discarding the remaining data wastes a portion of memory bandwidth. In addition, if system 10 is based on a directory-based coherence scheme, the node has no choice but to keep the cache line, because if the line was requested exclusively by processor 18 then, as far as system 10 is concerned, processor 18 now owns that entire cache line. And if bridge logic 20 discards half of the cache line and later has to do a write-back of the cache line to the system, it will need both halves of the cache line to do the write-back. That is a particular, problem for systems 10 having a directory-based cache coherency scheme. It would, however, be a difficult problem to solve even in a coherency scheme where bridge logic 20 is bridging a pair of snoopy buses. (There still exists the problem of how to write back a full cache line when only a part of that cache line comes from processor cache.)

In one embodiment, bridge logic 20 forwards the requested partial cache line to processor 18 and stores the remainder in bridge cache 112. For example, if the cache line size of the new processor is half the cache line size of system 10, one can store half the cache line in processor 18 while storing the remaining half in cache 112.

Cache coherence differences can also be an issue in fitting a new processor into an existing system. In one embodiment, transaction handler 26 within bridge logic 20 includes a coherence bridging engine (CE) 30. Coherence bridging engine 30 understands the coherence protocol of both the original processor and of the new processor and serves to bridge between the two coherence protocols. In another embodiment, coherence bridging engine 30 serves as an intermediary between the cache protocol of system 10 and the cache protocol of the new processor.

In one embodiment, bridge logic 20 is designed to support shared memory systems of up to 256 nodes, where each node includes up to four processors 18. Forty bits of physical address bits are used to address nodes and memory such that one terabyte of memory can be addressed. In one such embodiment, the new processor has 44 address bits, rather than the 40 address bits of the original processor. In such an embodiment, predefined address bits (e.g., the upper address bits) are treated as attribute bits, in order to memory map functions to various spaces.

In one embodiment, address bits from processor 18 are mapped so as to provide two views into memory 16 simultaneously with opposite byte orders. One such memory mapping scheme is shown in FIG. 3, where memory is mapped into two spaces and the endianness is handled based on the address space addressed by the memory request. In the embodiment shown in FIG. 3, a driver application can choose to use an address up in the upper version of IOSPEC space or can address the same location through the lower version of IOSPEC.

In one embodiment, bridge logic 20 applies one version of byte and address manipulation in one address space and another in the other address space. There are direct aliases where there can be two of the 44 bit addresses that will map to the same address on a system bus 25, but depending on which one of the aliases is used, logic 20 will handle the data as either little or big endian.

In one embodiment, a massively parallel processing (MPP) system designed for use with a MIPS 12 k microprocessor is retrofitted with an Intel Itanium™ microprocessor. One such MPP system is an SN1 manufactured by Silicon Graphics of Mountain View, Calif. The SN1 is a shared memory system in which each node includes four processors and memory. Each node is in turn connected to a network. The processor, memory and network interfaces are described in a U.S Patent application Ser. No. 09/407,428 entitled "MULTIPROCESSOR NODE CONTROLLER CIRCUIT AND METHOD," filed Sep. 30, 1999, the description of which is hereby incorporated by reference.

The SN1 System Architecture specifies a distributed, shared-memory multiprocessor employing up to 4096 processors. SN1 fully supports a single address space and provides cache coherence across the entire machine. SN1 is organized into a number of nodes; each node connects the local memory to the processors, provides a port to the Router Network, and a port to the IO subsystem.

In one embodiment, each MIPS processor in the node is replaced by an Itanium™ processor connected to processor bridge logic 20. One such embodiment is shown in FIG. 4.

Figure 4:
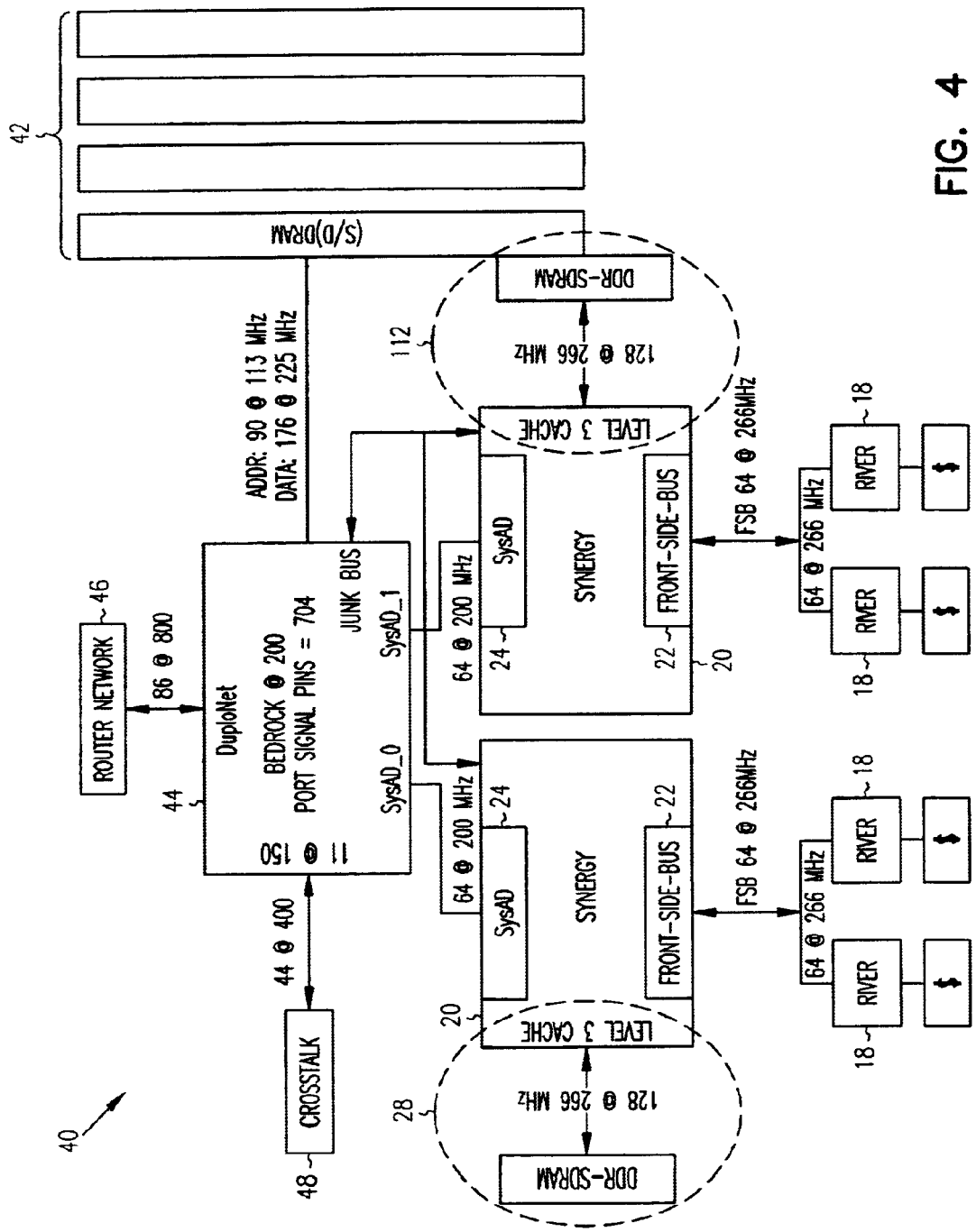
FIG. 4 shows an embodiment of the present invention, a computer system node 40.

In the embodiment shown in FIG. 4, each node 40 includes local memory 42, and a system interface device 44 which connects local memory 42 to processors 18 and which provides a port to Router Network 46 and a port to IO subsystem 48. In addition, each node includes processor bridge logic 20 which makes processors 18 look like MIPS microprocessors to system interface device 44 while presenting an Intel-like interface to each of the processors 18.

In one embodiment, each bridge logic 20 supports up to two Itanium™ processors, and a (64)-megabyte Level 2 (L2) cache. In another embodiment, each bridge logic 20 supports up to two Itanium™ processors, and a 32-megabyte Level 2 cache. In addition, processor bridge logic 20 can, through device 44, access global memory 16. In one such embodiment, logic 20 also can access the directory which maintains cache coherence, Crosstalk IO subsystem 48, and the SN1 Net including Router Network 46.

In one such embodiment, bridge cache 112 is implemented within logic 20 via on-chip Tag Random Access Memory (RAM), a Global Coherence Engine (GCE), and a memory interface (DI). Transaction handler 26 adapts processor 18 to the SN1 cache coherence protocol, and combines (64)-byte cache lines into (128)-byte cache lines. The unit of cache coherence for an SN1 system is a (128)-byte cache line. Bridge cache 112 operates in conjunction with transaction handler 26 to emulate a sub-set of the external interface of the R12K microprocessor, which allows connection into SN1 IO, memory and the network via system interface device 44. Memory-mapped registers (MMRs) that control programmable parameters of the bridge logic 20 are contained in local block 56, which processes access to the MMRs through processor interface 22, and through junk bus 58.

In one embodiment, bridge cache 112 is sixty-four megabytes in size and 8 way set associative. In one such embodiment, cache 112 is made up of sixty-four megabit DDR-SDRAMs, delivering the full bandwidth of the processor bus (FSB).

Figure 5:
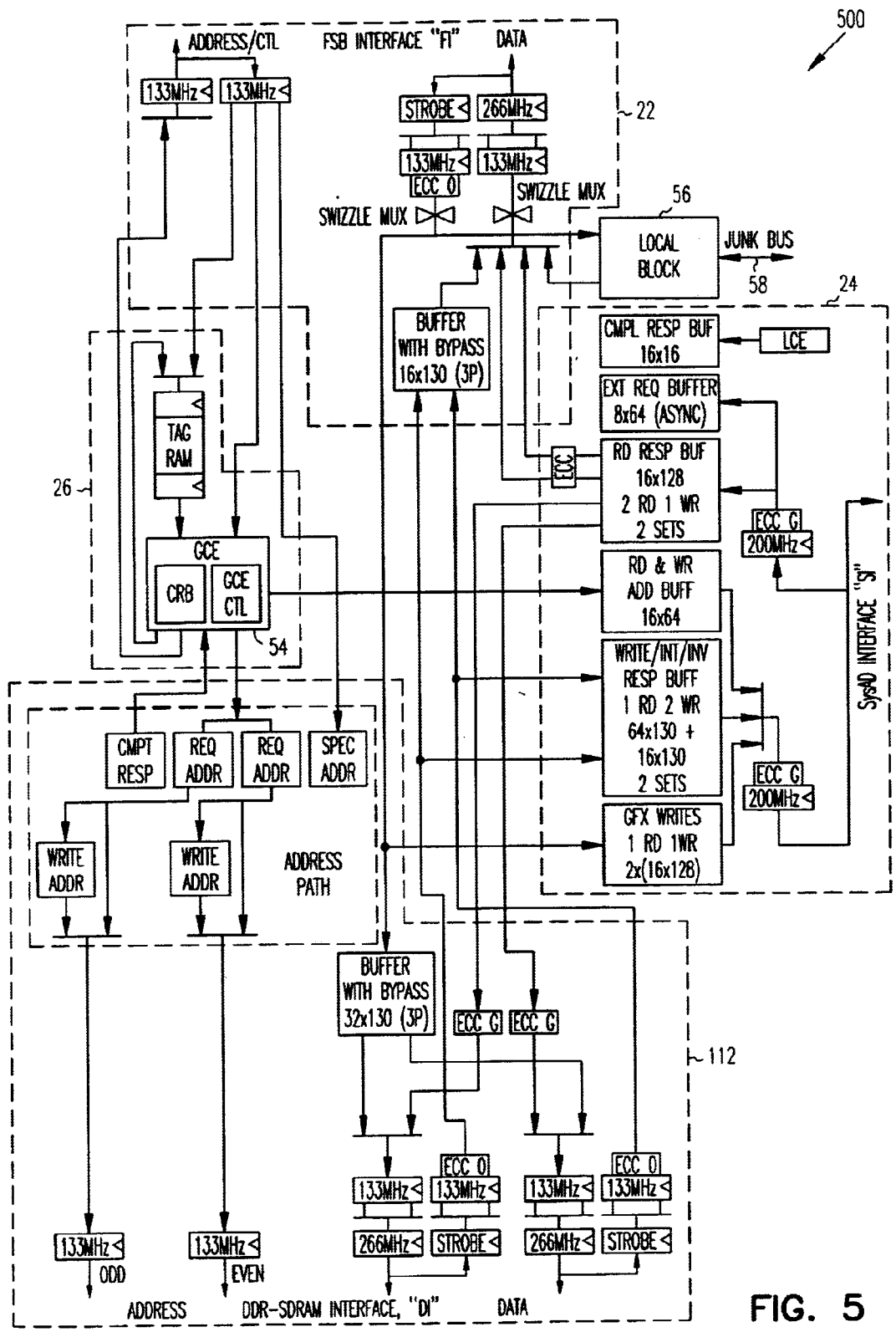
FIG. 5 shows an embodiment of the present invention, address and data paths 50 of processor bridge 20.

FIG. 5 illustrates chip data paths through one embodiment of bridge logic 20. In the embodiment shown in FIG. 5, processor interface 22 includes an address/control bus 50 and a data bus 52. In one embodiment, processor interface 22 is designed to interface with two processors 18 in a cache snooping configuration. This interface supports most request types from processors 18 and is capable of accepting and delivering data to processors 18 at full data-bus rate. In one embodiment, it can support up to 16 reads, and up to eight writes from the each processor 18.

Within bridge logic 20, interface 22 communicates with bridge cache 112, bus interface 24, a global coherence engine (GCE) 54 and a local block 56. Bridge logic 20 functional blocks communicate through a set of messages. In one embodiment, all block data transfers are divided into (64)-byte long block transfers. All non-block data transfer are 8 bytes long.

In one embodiment, all transactions from processor 18 are generally serviced out of order. System requests such as interventions (external requests to obtain the status and data of a cache line) and invalidates issued by GCE 54 are issued to processors 18 by interface 22. In one embodiment, interrupts are issued through local block 56 and interface 22 to processors 18.

To achieve high performance, in one embodiment, Tag RAM 60 for bridge cache 112 is implemented on chip. This provides low memory access latency for both cache hits and cache misses and also enables building a high level set associative cache.

Since there is limited space on an ASIC for Tag RAM 60, in one embodiment, each entry tags 512 byte blocks, or four sectors of (128) bytes each. Each Tag entry contains state information for its four (128)-byte sectors.

In one embodiment, each sector is composed of two (64)-byte cache sub-lines. In one such embodiment, to reduce intervention traffic the tag for each sub-line contains presence bits used to indicate whether the sub-line is cached by any of the processors 18.

In one embodiment, GCE 54 is responsible for servicing bridge cache misses, bridge cache line replacements, interventions, and invalidates from system. In addition, GCE 54 services uncached reads and writes. It is also responsible for resolving all coherence-related conflicts.

In order to maximize the total number of outstanding requests, resources of both of device 44's processor interfaces {SysAD_0 and SysAD_1 } are used. This allows each bridge logic 20 to have up to eight outstanding reads and sixteen outstanding write backs. GCE 54 maintains an entry for each outstanding request.

In one embodiment, the two processors 18 sharing interface 22 snoop requests on the processor bus, and are able to respond to coherent requests. Algorithms implemented in GCE 54 allow this type of coherency to co-exist with the SN1 directory-based coherency. Since the cache line exists in bridge cache 112, system 10 saves an extra trip to the memory/directory of device 44, leading to lower memory access latency for shared data.

In one embodiment, bridge cache 112 keeps a super-set of the processors' internal caches for lines in the Exclusive and Modified states. Although cache lines in the shared state are cached in bridge cache 112, cache replacement algorithms in GCE 54 will replace a line in the shared state without forcing its eviction from caches internal to processors 18.

In one embodiment, local resources and programmable registers of processor bridge logic 20 are software visible through the entire network address space. This is accomplished via the junk bus 58, for remote access. For local access, each local processor 18 is able to access its local resources directly.

In one embodiment, bus interface 24 operates at a frequency of 200 MHz. In one such embodiment, interface 24 uses the flash cycles to support a super-set of protocols tailored specifically to be used with device 44. (Flash cycles are special cycles used for making operations in system interface device 44 visible to bridge logic 20; completion of uncached operations is one of the operations monitored during flash cycles.) Each bridge logic 20 uses all the resources from each SysAD interface 62 of device 44. Thus each bridge logic 20 is able to have up to eight outstanding reads and sixteen outstanding writes. In one embodiment, bus interface 24 implements most of the coherency rules implemented in an R12K processor.

In one embodiment, as discussed above, bridge logic 20 includes support for byte swapping. Via a mode bit selectable at reset time it can be programmed to swap all bytes for cached operations, meaning that it will swap all bytes on cached reads and write backs. For uncached operations, the byte swapping mode is address based, and A43 of the address selects byte ordering of the current request.

To ensure forward progress is maintained, in one embodiment, bridge logic 20 always services replies from interface 24 before servicing requests. Thus cases where a read reply is immediately followed by an intervention, bridge logic 20 will transfer the read reply to the processor before it consumes the intervention.

To prevent deadlocks, in one embodiment, there is a request and a reply virtual channel within bridge logic 20. These two channels are kept independent; all requests, such as reads and writes travel on the request channel. Responses to these requests travel on the reply channel. Before issuing or accepting requests, hardware within bridge logic 20 guarantees that there is reply space available for a new request.

In one embodiment, there are dedicated buffers on bridge logic 20 to receive read replies from system interface device 44. In addition, bridge logic 20 is able to accept speculative replies from system interface device 44. There are also dedicated intervention response buffers connected through bus interface 24 to system interface device 44 in order to break request-request dependencies, or dependencies between write backs and intervention responses.

Since the bridge cache 112 is multi-set associative, to prevent deadlocks, space is reserved for the reply of each request that missed in the cache.

In one embodiment, each processor 18 expects a completion/acknowledge cycle for any outstanding Write. For all external uncached writes to system, bridge logic 20 acknowledges each write once it has been completed. The completion of uncached operations is flagged on bus interface 24 on flash cycles. All uncached accelerated writes (e.g., typically a stream of one-byte writes that are coalesced in bridge logic 20 into cache-line-sized chunks) are acknowledged immediately.

Bridge logic 20 adopts a consistency model wherein all Invalidate and Intervention requests from device 44 are issued in FIFO order. There is no order maintained between non-conflicting cached reads and write backs. Reads that conflict with write backs are held until write backs are issued to device 44. Finally, all uncached operations from processor interface 22 to network 14 are in FIFO order.

Bridge logic 20 contains some amount of hardware to convert a write combining write from processor 18 into SN1 style uncached accelerated writes. It complies to the uncached accelerated write protocol as specified for the R12K.

Any uncached writes to memory, normal uncached writes, that are converted to uncached accelerated writes in device 44, may not be kept in FIFO order with previous uncached accelerated writes issued by processor 18. In one embodiment, bridge logic 20 keeps the uncached accelerated buffer apart from normal uncached writes.

Processor interface 22 will be described next. In the SN1 embodiment discussed above, lines 50 and 52 operate as described in the Intel Itanium™ System Bus Specification. The bus is transaction based, non-blocking (i.e., address and read data can occur out of order), and pipelined.

In one embodiment, processor bridge logic 20 is designed as a replacement to the Intel chipset for the Itanium™ processor. With an Intel chipset, there are partial cache-line read and write cycles which get implicit write backs (when new data is arriving to a cache, an old cache line needs to be freed up for use; write backs are needed to free up a cache line for other data when data in the cache has been modified and thus needs to go back to memory; implicit write backs are those initiated by another processor besides the locally-connected one) of the entire cache-line for a total of two data cycles. One use for such cycles occurs because Intel chipsets perform I/O coherency by presenting all snoopable transactions on the bus; these transactions are often partial cache lines. Partial cache-line write cycles can also occur when the processor caches contain write-through (WT) pages as well as write-back (WB).

In one embodiment discussed above, processor bridge logic 20 does not support this type of transaction because I/O coherency is maintained in system interface device 44. System 10 will, in such an embodiment, support WB, UC (uncached), and WC (write-combining for graphics pipes) and not WT.

In one embodiment, processor bridge logic 20 supports defer requests (needed in the unusual case that a transaction is marked as deferred, but then later has to be retried or has a hard error). It should be noted that Itanium™ processors do not defer; only the IO/memory interface (i.e., processor bridge logic 20 in this embodiment) defers. Processor bridge logic 20 uses the defer phase signal IDS (ID strobe) to present read data on the bus. Bridge logic 20 can prevent conflicts with write data from processors 18 by either determining that no CPU is about to present write data or by stalling a CPU that wants to do so by withholding TRDY.

In one embodiment, processor bridge logic 20 is the only driver of the response bus; processors 18 never drive the response bus.

In one embodiment, processor bus 22 is pipelined and can have up to eight in-order-queue (IOQ in this document) requests active. Many requests can be deferred in the response phase and at that point they are removed from the IOQ, allowing yet more requests to be presented on the bus. There is a DID (deferred ID) number presented in the request phase which, should the request be deferred, is later used to associate the final state of completion of the request (and possibly the data) with the initial request. The DID field is eight bits, although for one embodiment, there are only sixteen deferred requests per CPU 18 (the present encoding of the eight bits is that one bit distinguishes IO/memory requests from CPU requests, three bits are CPU number, and four bits are request number within a CPU).

Read data of all types can be deferred or retried. Write-back (WB) writes cannot be deferred or retried. Uncached (UC) writes and reads can be deferred or retried. When a uncached write is deferred, in one embodiment bridge logic 20 accepts the data before the defer response, but since the response is defer, the requesting processor 18 will know that it is not complete yet.

In one embodiment, bridge logic 20 must always be prepared to accept write data from a WB write request or implicit write back data from a request that started out as a read request. If bridge logic 20 does not have the buffer space or other resources to be able to handle WB write data, it must either get control of the processor bus to prevent new CPU requests or it must stall the WB data. There is a TRDY (target ready) signal to stall the write data, although this action blocks other IOQ requests from progressing past their snoop phases. This is because IOQ[n] must complete its write data phase before it can get to the response phase where it is removed from the in-order-queue (whether or not it is deferred or even retried) and IOQ[n+1] cannot start its data or response phase until that happens. Thus, up to seven IOQs could proceed to their snoop phases, but could proceed no further if TRDY were to be withheld for a long enough time.

Withholding TRDY will not prevent defer phase IDS transactions, so progress can be made on completing deferred reads and writes. Defer cycles can also happen if bridge logic 20 has taken control of the processor bus for the sole purpose of shutting off more CPU requests.

In one embodiment, bridge logic 20 includes a coherent request buffer (CRB) 64 which stores the state for any coherent request. In one such embodiment, bridge logic 20 always defers reads, even for local block access. In addition, bridge logic 20 often will retry reads because of CRB conflicts, among other reasons.

Writes always present their data, even if they ultimately get retried. WB cache line writes and IWB (Implicit Write Back) writes are always completed in the IOQ. UC writes are typically deferred and have VSBL asserted (VSBL asserted means that the write is made visible to the rest of system 10).

In one embodiment, processor interface 22 does a small amount of address decoding to determine byte swapping to support both big-endian and little endian data. It also decodes the request type to determine the amount of encapsulation it provides for the FSB. For instance, some operations (such as interrupt, purge TC, and some status type operations) expect the central agent (which bridge logic 20 is, along with being the memory and I/O interface) to automatically handshake with the response phase on behalf of the symmetric requesters (the CPUs 18). In other cases, processor interface 22 expects the GCE logic to determine the type of response (such as the decision to retry requests). Part of keeping track of when write data from the CPUs 18 might be appearing on the data lines (and therefore when read data cannot be driven back to them) involves remembering the initial type (read/write and zero/non-zero length) of the request as well as the HITM status to know when the CPUs 18 are waiting for TRDY. This latter information is needed to know when defer phase operations can occur. (HIT and HITM are used to indicate that one of the processors 18 has the indicated line in cache. HITM (hit modified) means that the line in cache has been modified.)

In one embodiment, processor bridge logic 20 does not expect to support cached operations smaller in size than a cache line (64 bytes). This excludes two types of transactions illustrated in the Itanium™ System Bus Specification, namely a partial cache line read or write that includes an implicit write back of the whole cache line.

In one embodiment, the UC/WC/WB/WT attributes are also encoded into the address bits. In such an embodiment, when there is a mismatch of the UC/WC/WB/WT attributes in the attribute field of the request lines vs. the attributes inferred from the high address bits, processor interface 22 modifies its behavior to inhibit write data being pushed, e.g., to the processor interface data buffers. It will also cause a hard error response where possible for the operation and set a status bit.

In one embodiment, processor interface 22 obeys the bus rules as far as LOCK is concerned, although the intended effect will not necessarily take place. In one such embodiment, there is a status signal that can be connected to a local block register to record the fact that a CPU has issued a LOCK.

In one embodiment, processor interface 22 uses the upper address bit to determine how to handle endianness. It remembers this decision from the request phase up through the data phase. In one embodiment, GCE 54 is responsible for remembering the equivalent decision for data out along with the DID for reads.

In one embodiment, GCE 54 does further decoding of the request and determines the response. One example of such an embodiment is shown in FIG. 6, where "GCE determines response" means that GCE 54 does further decoding and determines the response. Since bridge logic 20 is the only driver of the response bus, it always asserts the response; the issue is whether processor interface 22 automatically determines the type of response or whether GCE 54 determines the response type, usually defer vs. retry.

In FIG. 6, the column "generate as master" means that the processor bus logic (as master of the processor bus) drives out this request type, and the column "pass to GCE" means that GCE 54 receives this type of request from processor interface 22 with a valid strobe. The entry "status pulse" means that, while the request type has RBI (request bus interface) IGNORE asserted so GCE 54 does not process it directly, there is a status line to local block 56 so that it may set a status flag.

In one embodiment, GCE 54 communicates with the original issuer of a request by indicating whether the request will be accepted but postponed for a while (defer) or whether it should be reissued (retry). In one such embodiment, these options are communicated with a processor 18 by a bit per possible IOQ. (Because of this, the CRBs in GCE 54 must remember the IOQ NUM that was initially assigned to a request coming off the processor bus. Processor interface 22 will, in one embodiment, internally set DEFER for all reads and DEFER/VSBL for UC writes.

In one embodiment, processor interface 22 stalls the processor bus when bridge logic 20 runs out of certain resources. In one such embodiment, processor interface 22 simply grabs the bus by asserting BPRI (the bus priority agent) and then holding it. BNR (block next request) is asserted to get to the throttled bus request state in order to space out requests as GCE resources approach the level where they run out. If the STALL_WARN (a warning from the coherence engine to the FSB interface) was not asserted, GCE 54 will assert STALL at the point when it has two left of the most scarce resource. (In such an embodiment, the effect of the BPRI signal allows at least one request after its assertion.)

In one embodiment, bridge logic 20 will issue a number of requests to the processor bus through processor interface 22. For instance, a system intervention/invalidate request requires most of the address bits, down to the system cache line size. In one embodiment, processor interface 22 automatically issues both (64)-byte halves of the (128)-byte request.

In one embodiment, another request, the victim intervention request (a request from the bridge logic cache 112 to the processor to see if the processor's copy of data has been modified), is automatically expanded to the number implied by the sectoring of tag ram 60. In another, the victim intervention request is only expanded for those (64)-byte lines that have their presence bits set.

The interrupt request is another request issued by bridge logic 20 to processors 18. Each interrupt request requires a CPU ID in which a unique number gets set into each CPU 18 in a register.

The deferred request on the request/address bus is required for those CPU requests that were originally deferred, but which now require not the read data or the write completion handshake (which Synergy would have issued via the defer phase), but instead need a hard error or a retry response.

In one embodiment, other available requests include "Purge TC", which issues requests of that name and "FLUSH_REQ", which issues flush cache requests by asserting the FLUSH pin. Bridge logic 20 reviews the number of Flush Acknowledge special operations contained in the FLUSH_NUM_CPUS before it asserts the FLUSH_DONE signal.

In one embodiment, when more than one of the request types is asserted, the priority will be from highest to lowest—e.g., flush, hard-error/retry, interrupt, victim intervention, and SI intervention/invalidate. Once a victim intervention or bus interface intervention/invalidate is started, however, all the sub-transactions are issued as one indivisible operation. Processor interface 22 must be aware that once it gets ownership of the processor bus (FSB), one more request can sneak in and that request may be for part of the system cache line.

In one embodiment, victim and exclusive interventions issue a BIL so that, if neither CPU 18 asserts HITM, the operation simply ends there. A shared intervention will issue a BRL. If a CPU 18 asserts HITM (i.e., it has the line and it has been modified), an implicit write back will occur; otherwise, bridge logic 20 asserts DEFER in the snoop phase (as it does for all reads), returns a retry response, and simply drops or forgets about the request.

In one embodiment, Global Coherence Engine (GCE) 54 coordinates messages flowing between the main interfaces of bridge logic 20, and manages bridge cache 112. Using bridge cache tag state, outstanding request state, and a coherence table, GCE 54 enforces local processor bus and global SN1 coherence. GCE 54 also manages all bridge logic 20 resource allocation, stalling new requests whenever resources become unavailable due to transactions in progress.

In one embodiment, GCE 54 arbitrates among messages from different processor bus phases, passing each in turn through a pipeline which includes a tag cycle (lookup or update), access to the Coherence Request Buffer block (CRB), and a coherence table lookup. The CRB tracks transactions in progress by allocating an internal resource to each, and maintaining state as to allocated buffers, messages awaited from the other units, etc. Updated CRB state and messages to the other units are generated through the coherence table lookup.

The Global Coherence Engine is described in "Maintaining Cache Coherency between a Bus-Based Snoopy Protocol and a Directory-based Protocol", filed herewith, the description of which is hereby incorporated by reference.

As noted above, bridge cache 112 provides a buffer used to reduce the latency caused by any bus conversion logic. In addition, bridge cache 112 operating with GCE 54 is critical in maintaining cache coherence across a plurality of cache coherence schemes and in handling differences in cache line size. A cache and DRAM interface that can be used effectively for bridge cache 112 is described in a U.S. Patent Application Ser. No. 09/650,100 entitled "METHOD AND CACHE-COHERENCE SYSTEM ALLOWING PURGING OF MID-LEVEL CACHE ENTRIES WITHOUT PURGING LOWER-LEVEL CACHE ENTRIES," filed on even date herewith, the description of which is hereby incorporated by reference.

In one embodiment, a read request to bridge cache 112 that originates from an processor 18 read request causes a completion response that first passes through GCE 54. There it may be delayed before it is presented to processor interface 22 until, for instance, the request has had its response phase on the processor bus. In one embodiment, processor interface 22 includes an eight deep queue for accepting the CE_FI_LRP items (signals from coherence engine to FSB interface for local response).

In one embodiment, bridge cache 112 writes at will to two buffers, one for each of the two banks. Processor interface 22 knows which of the two buffers to read by examining the coherent request buffer address. In one embodiment, processor interface 22 always reads the (64) bytes within a request in the same order (word 0..3) because bridge cache 112 has placed the data in the buffer in critical word first order (when a cache line of 128 bytes is fetched on the 8-byte bus, the 8-byte doubleword having the data requested by the processor is fetched first, and then the remainder of the cache line is fetched into the cache, in order that the processor's critical data arrives first).

When the defer phase actually occurs on the processor bus, processor interface 22 drives the DID field on the processor bus and returns the CMD and CRB fields to GCE 54 to close out the request.

A read request to bus interface 24 that originates from an FSB read request causes a completion response that first passes through GCE 54. There it may be delayed before it is presented to processor interface 22 until, for instance, the request has had its response phase on the processor bus. In one embodiment, processor interface 22 includes an eight deep queue for accepting the CE_FI_XRP (coherence engine-to-FSB interface external response) items ("coherent read requests": signals from the coherence engine to the FSB interface for external response).

In one embodiment, bus interface 24 writes into a buffer in linear order, undoing the effects of a critical word first request to system 10. In one such embodiment, the address of the buffer is determined by consulting predefined address bits.

When the defer phase actually occurs on the processor bus, processor interface 22 drives the DID field on the processor bus and returns the CMD and CRB fields to GCE 54 to close out the request.

Interrupts generated through device 44 are transmitted through bridge logic 20 to processors 18. In one embodiment, bus interface 24 monitors flash cycles on the SysAD bus to see writes to interrupt bits within bridge logic 20 and also monitors interrupt commands on SysAD 62. It passes this information on to local block 56, which maintains an array of (128) single-bit registers that remember that an interrupt needs to be sent at that level. Local block 56 also includes a priority encoder to pass off a command to processor interface 22 to issue an interrupt at that level on the processor bus. Local block 56 then asserts LB_FI_INTR_VALID (local block to FSB interface interrupt valid signal) with an appropriate LB_FI_INTR_LEVEL to processor interface 22. Processor interface 22, in turn, includes a local block register that associates the LB_FI_CPU_NUM (identifying the appropriate processor) with the destination ID to be driven for the interrupt transaction.

After processor interface 22 finishes issuing the interrupt command on the processor bus, it asserts FI_LB_INTR_DONE for one clock which tells local block 56 that it can issue another request if there are further interrupts to issue.

In one embodiment, bus interface 24 monitors flash cycles on SysAD 62 bus to see writes to two register locations in order to capture the data required for Purge TC operations. As each write occurs, bus interface 24 asserts SI_FI_PURGE_TC_VALID (a SysAD interface to FSB purge signal) along with the associated data. In one embodiment, the SI_FI_PURGE_TC_CMD has two values, one for the first and another for the second flash locations. When the second location's SI_FI_INTR_VALID occurs, processor interface 22 tries to issue the purge TC transaction. A another SI_FI_PURGE_TC_VALID before the first pair has completed (been issued and TEND has been deasserted) will cause an interrupt and set an error bit.

One embodiment of a bus interface 24 will be described next. In operation, bus interface 24 takes on the role of emulating the original processor. In the SN1 embodiment described above, bus interface 24 takes on the role of an R12K processor and communicates with system interface device 44, which acts as the external agent.

In one embodiment, bus interface 24 accepts requests from the processor interface 22 and transfers them to the SysAD Bus 25 using both sets (SysAD-0 and SysAD_1) of processor resources on the SysAD interface of system interface device 44. For coherent requests (reads and write backs), the address (odd or even (128)-byte cache line) of the request determines which channel the request is issued. For noncoherent requests, channel selection is based upon which processor 18 originated the request.

In one such embodiment, bus interface 24 takes on the role of an R12K processor and communicates to system interface device 44, which acts as the external Agent.

Figure 7:
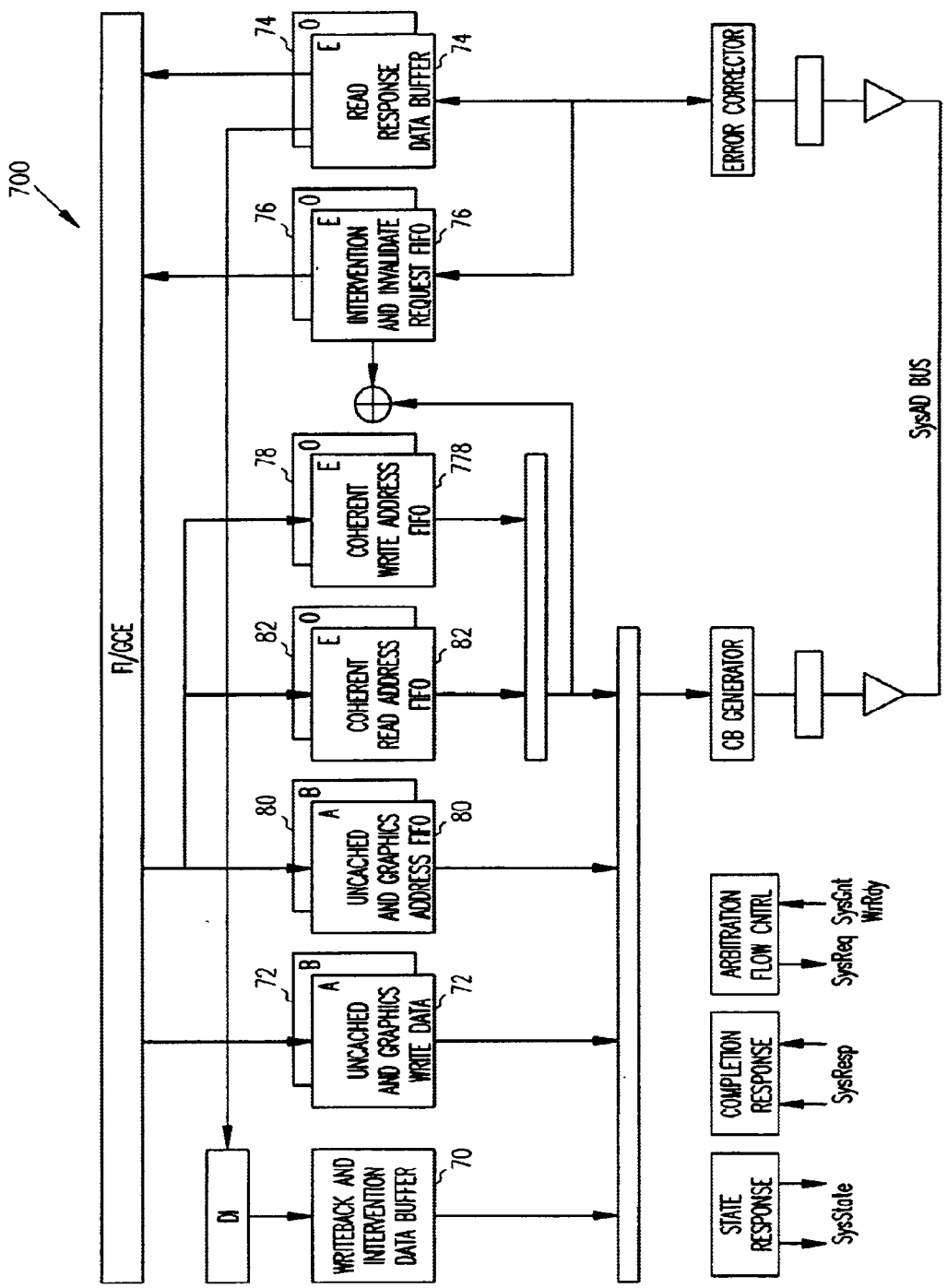
FIG. 7 shows an embodiment of the present invention, system interface 700.

FIG. 7 is a high level block diagram of bus interface 24, and illustrates the main address and data buffers and interconnects. Generally, buffers occur in pairs, corresponding to the two separate channels (Even/Odd and A/B). In one embodiment, bus interface 24 operates within two clock domains, the 133 MHz domain of processor interface 22 and bridge cache 112 and the 200 MHz domain of the SysAD Bus. The address and data buffers provide the boundary between the clock domains through the use of separately clocked read and write ports (i.e., the processor interface and bridge cache connected ports operate at 133 MHz while the SysAD ports operate at 200 MHz).

In one embodiment, bus interface 24 includes three sets of data buffers: the write back and intervention response data buffer 70, the uncached write data buffer 72 and the read response data buffer 74. Address FIFOs 76 and 78 are associated with write back and intervention response data buffer 70. Address FIFO 80 is associated with uncached write data buffer 72 while address FIFO 82 is associated with read response data buffer 74.

Figure 8A:
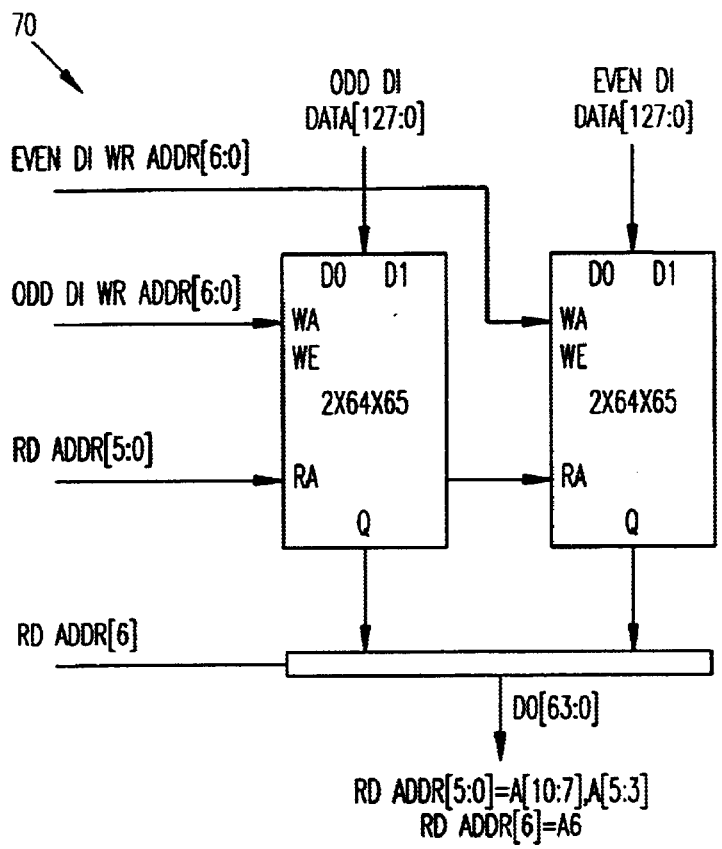
FIG. 8a shows an embodiment of the present invention, writeback and intervention response buffer 70.
Figure 8B:
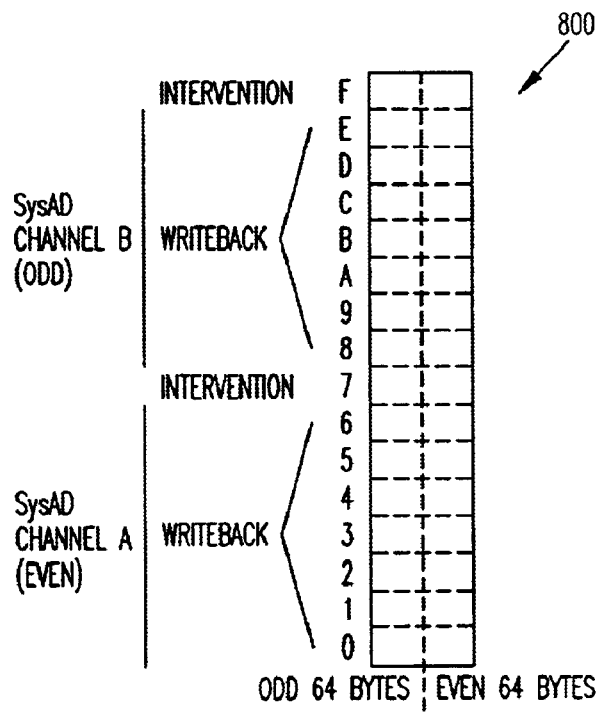
FIG. 8b shows a mapping 800 used by writeback and intervention response buffer 70.

FIG. 8a is a more detailed block diagram of Write back/Intervention Response data buffer 70. FIG. 8b illustrates the amount of data storage contained in buffer 70 (i.e., in (64)-byte bridge cache 112 line quantities). In one embodiment, data buffer 70 is constructed from four 2-port register files. Two register files are used for odd (64)-byte bridge cache lines 90 and two register files are used for even (64)-byte bridge cache lines 92. Together, they allow fourteen (128)-byte system cache lines for write back buffering and two (128)-byte system cache lines for intervention response buffering. In one embodiment, write back and intervention response data buffering are combined into a single ram structure because they share the same read and write data buses and are never accessed simultaneously.

In one embodiment, the odd and even halves of bridge cache 112 have independent write ports. This allows for the two writes to occur in parallel, and therefore simplifies control logic. In one such embodiment, the write logic of the register files operates in the 133 MHz clock domain, while the read logic operates in the 200 MHz clock domain.

In one embodiment, bus interface 24 reads intervention response data in sub-block order. Processor interface 22 and bridge cache 112 write the data in sequential order. Therefore, bus interface 24's read access will not begin until the entire (128)-byte cache line has been written.

Figure 9A:
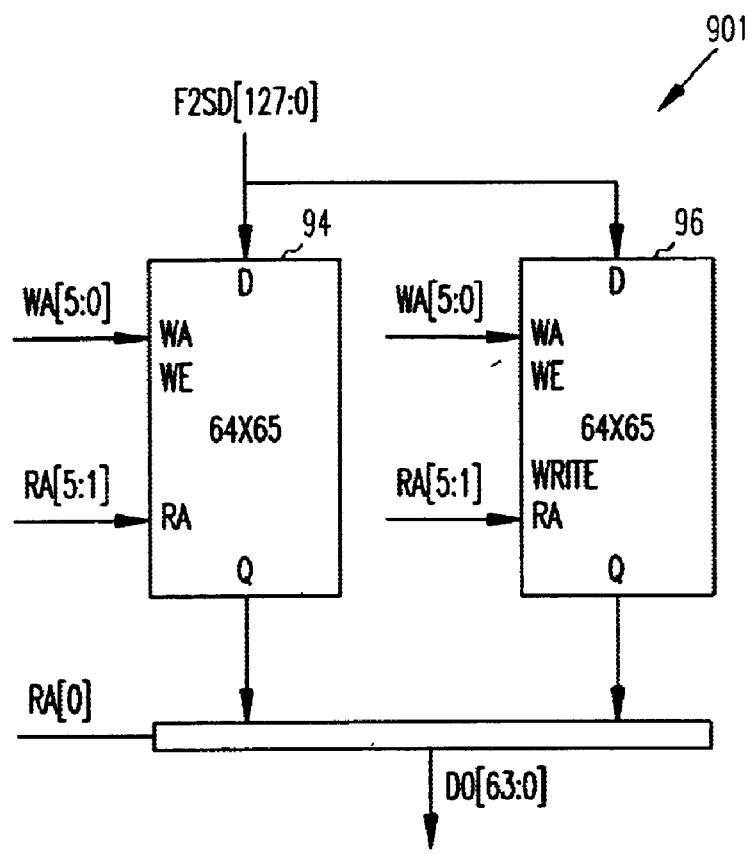
FIG. 9a shows an embodiment of the present invention, uncached & incached accelerated write data buffer 901.
Figure 9B:
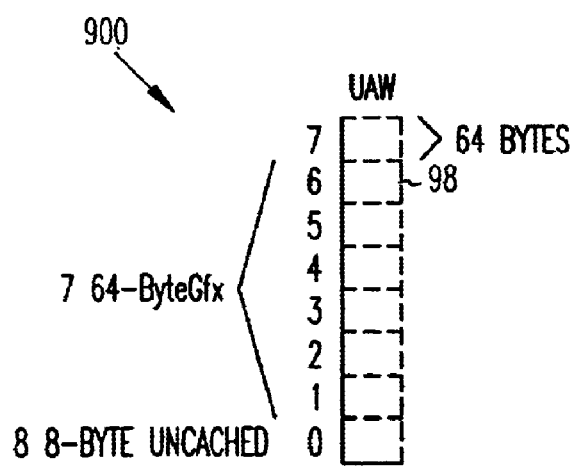
FIG. 9b shows a mapping 900 used by uncached & incached accelerated write data buffer 901.

FIGS. 9a and 9b show details of uncached write data buffer 72. In one embodiment, each processor 18 has its own uncached write data buffer (94, 96). Each write data buffer 72 includes eight (64)-byte sub-buffers 98, where buffers 1–7 are used for gathering WC data and quadword store data, and buffer 0 is used to store the data for up to eight double-word (or less) uncached stores. This function is described in "Use of Deferral as a Flow Control Mechanism", filed herewith, the description of which is hereby incorporated by reference.

Figure 10A:
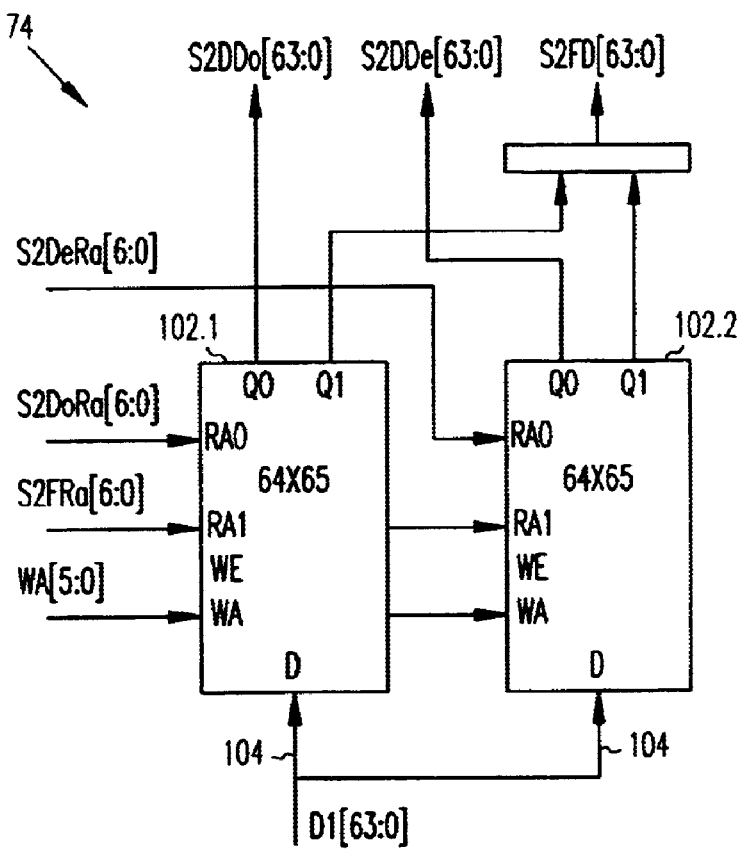
FIG. 10a shows an embodiment of the present invention, coherent read response buffer 74.
Figure 10B:
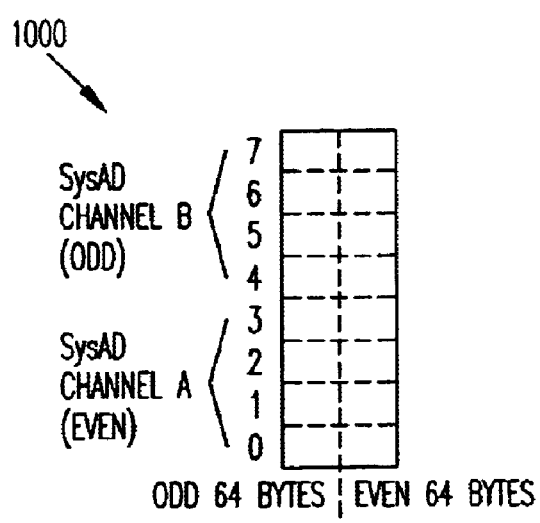
FIG. 10b shows a mapping 1000 used by coherent read response buffer 74.

FIGS. 10a and 10b show the construction of an eight (128)-byte system cache line response buffer (74) built from two 64×65 register files (102.1 and 102.2). Each register file 102 has one write port (D) and two read ports (Q0, Q1). The dual read ports allow processor interface 22 to issue the response to the processor bus independently of bridge logic 20 issuing the refill to bridge cache 112. The read port of register files 102 operate in 133 MHz clock domain, while the write port operates in the 200 MHz clock domain.

In one embodiment, eight block read response buffers are required to absorb the eight read responses associated with the eight possible outstanding SysAD read requests (i.e., four requests per channel). The system coherency protocol allows for cases where two responses result from the issue of a single request (the second will overwrite the first). The block response data is written in sub-block order.

Figure 11:
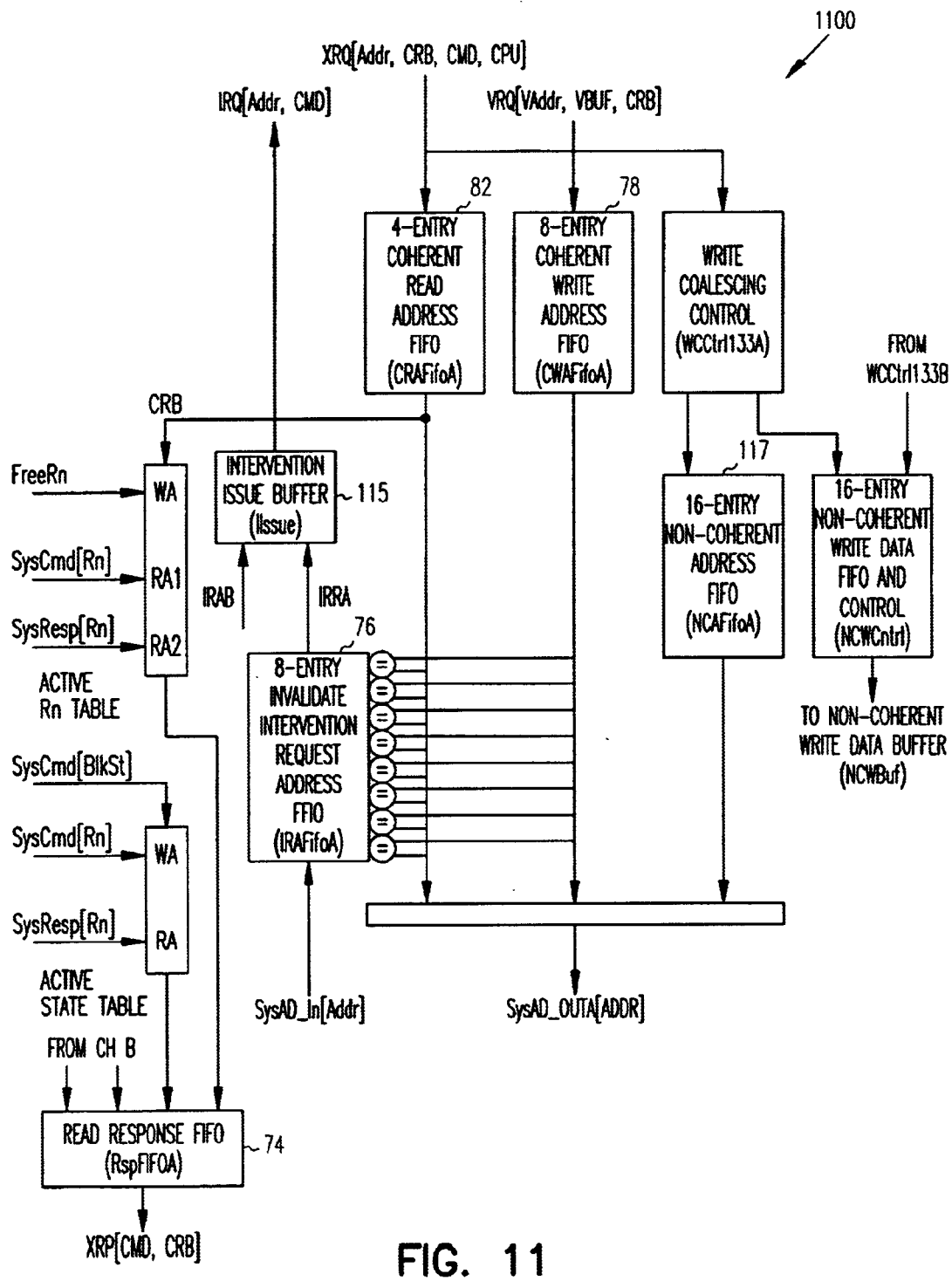
FIG. 11 shows an embodiment of the present invention, coherent address logic 1100.

FIG. 11 shows the major address paths and FIFOs of coherent address logic 1100 for a single channel. Requests which originate from GCE 54 are placed into one of three address FIFOs. Uncached reads, uncached writes and graphics writes are placed into the 16-entry non-coherent address FIFO 117. Write back addresses are written into the 8-entry coherent write address FIFO 78 and coherent read addresses are placed into the coherent read address FIFO 82. In one embodiment, writing into these address FIFOs occurs in the 133-MHz clock domain.

Requests which originate from the SysAD Bus (intervention and invalidate request) are placed into the eight entry incoming request address FIFO (IRA) 76. The intervention request addresses A and B go to intervention issue buffer 115.

The conflict detection of outgoing coherent read and write request to active IRA entries provide a single point of cache coherency at the SysAD Bus. What this means is that bus interface 24 will not issue conflicting requests onto the SysAD Bus (i.e., issue a read or write back request if an invalidate or intervention is pending).

Intervention and invalidate requests are always sent on to GCE 54. Only one invalidate or intervention, however, will be actively issued to GCE 54 (per channel).

In one embodiment, coherent read requests (matching the odd/even channel address) are placed into a four-entry coherent read address FIFO 82. When coherent read address FIFO 82 becomes non-empty, bus interface 24 acquires bus mastership of the SysAD Bus (unless it is already bus master (i.e., parked)) as soon as there is a free request number available. Once the bus has been acquired (and the IRA is updated from the last incoming request) the read address is checked to determine whether a conflict exists with an active entry in the IRA. If a conflict is detected then a negative acknowledge message (XRSPN) is issued to processor interface 22 and the read request is removed from FIFO 82. If no conflict is detected then the read request is issued (on the SysAD bus) and an entry is made into a table which will cross index the SysAD request number with the CRB issued by GCE 54.

When GCE 54 issues a coherent write request (VBW), the address along with the victim buffer number and the CRB will be placed into coherent write address FIFO 78. Subsequently, transaction handler 26 writes the data into the WI Buffer. When the data is written, data valid bits are set to indicate that the data is available and the SysAD bus transaction can be requested. Once bus mastership is acquired, a final IRA look-up is performed. If no conflict is detected, then the SysAD bus write back transaction is performed, and a VCP (victim complete) message is returned to GCE 54.

If, however, a conflict is detected in the IRA, then the SysAD bus write back transaction is not issued and the VCP will not be issued. The IRB entry will have responsibility for issuing the VCP after a coherent data response (and/or state response) is issued on behalf of the cache line. In this conflict case, GCE 54 returns an IRSPV (intervention response, victim detected).

Note that it is possible for bus interface 24 to receive the VBW and the IRSPV (or IVRSPV) in any order. Bus interface 24 will not, however, issue the coherent data response (on the SysAD) until the IRSPV have been received (even if the VBW is backed up in the coherent write address FIFO). The VCP message is sent to GCE 54 once the coherent data response has been issued (and the write back buffer is re-allocatable) and the VBW has been removed from its FIFO (which may occur at a later time).

In one embodiment, all noncoherent requests are placed in order into 16-entry address/cmd FIFO 117. This corresponds to the maximum allowable outstanding non-coherent transactions of:

8 uncached writes (UCW) double-word or less
7 coalescing writes (WCW) or quad-word uncached writes (UCW)
1 Uncached Read (UC)

When FIFO 117 becomes non-empty, bus interface 24 performs a SysAD Bus transaction as soon as resources are available (i.e., read request number available, WrRdy de-asserted, etc.).

In one embodiment, uncached read requests will be translated into 1, 2 or 8 double/single/partial word SysAD Bus transactions and will contend with higher, priority coherent block read requests for the use of free request numbers. For the cases where 2 or 8 partial SysAD Bus transactions (which correspond to 16-byte and (64)-byte noncoherent read requests, respectively) bus interface 24 issues the requests one at a time. The read acknowledge message will be issued to processor interface 22 after the SysAD response for the last uncached request has occurred.

In one embodiment, uncached write requests are translated into 1 or 2 (for quad-word) double/single/partial word write SysAD Bus transactions.

In one embodiment, coalescing writes are handled in the following manner. WC stores which hit the graphics page are issued onto the SysAD bus as uncached accelerated store block ((128)-byte) or store partial ((64)-byte or less) transactions. Bus interface 24 attempts to gather doubleword WC stores into (64)-byte blocks, and then tries to gather doubleword WC stores into (64)-byte blocks, and then tries to gather (64)-byte blocks into (128)-byte blocks in order to issue (128)-byte uncached accelerated transactions on the SysAD Bus. Uncached writes (double word or less) which hit the graphics page are issued as partial word uncached accelerated SysAD bus transactions after flushing all prior WC transactions (partially gathered) onto the SysAD bus. WC stores which miss the graphics page are issued as uncached writes (doubleword of less) on the SysAD Bus.

All uncached transactions which are not gatherable WC transactions, flush all partially gathered WC transaction onto the SysAD bus (as a series of one or more partial uncached accelerated writes).

In one embodiment, bus interface 24 attempts to gather coalescing writes into (128)-byte SysAD Bus uncached accelerated store transactions. Gathering is performed in two phases. During first phase bus interface 24 attempts to collect multiple 8-byte WC writes into a single (64)-byte write transaction. This is accomplished by means or an "in progress" re-order register, which is opened when a partial WC write occurs and matches the graphics page. Subsequent sequential double-word WC writes to the same (64)-byte block will be merged into a single entry in the graphics address FIFO if all WC writes form a series of sequentially increasing double-word stores.

If an 8-byte WC store is merged at this phase then a WCACK reply message is issued to processor interface 22. When a WC store occurs to an address which does not match the address contained in the re-order register, or if the WC store is not to next sequential double-word, the contents of the re-order register will be flushed to the SysAD Bus.

The second phase of gathering occurs at the output of the graphics address FIFO 80. An attempt is made to consolidate two consecutive (64)-byte block stores into a single (128)-byte uncached accelerated block write. If there is a single even (64)-byte block store in graphics address FIFO 80, a request for the SysAD Bus will not occur until a second valid entry is detected. If, however, a second (64)-byte block write to the odd half of the (128)-byte address is detected, a single (128)-byte uncached accelerated transaction is issued on the SysAD Bus and two WCACK replies are sent to processor interface 22. If the subsequent request is not a full odd (64)-byte block store (with the same (128)-byte address) then the (64)-byte block store is placed on the SysAD Bus as eight separate 8-byte uncached accelerated writes. When the uncached accelerated store(s) have been issued on the SysAD Bus for a particular WC store, the WCACK reply message is issued to processor interface 22 (indicating that further WC store can be accepted).

The write gathering scheme requires that processor 18 place the contents of its write coalescing buffers on the processor bus in program order. This means that the entire contents of one WC buffer must appear on the processor bus before any of the second appears on the processor bus. If a non-full WC buffer is flushed, the multiple partial writes will also need to issue on the processor bus in ascending sequential order (i.e., the same order that they were written).

Both the internal Itanium write gather and the bus interface write gather can be flushed by issuing an uncached st.rel store instruction.

A summary of actions taken for incoming transactions is shown in FIG. 12.

Coherent read responses will be discussed next. In one embodiment, the table used to cross index request numbers is also used to record the state of the cache line included with the SysAD block data response. The block data response is placed into the response buffer corresponding to the indexed request number. The occurrence of a normal completion response (on the SysResp bus) will cause bus interface 24 to send the desired flavor of XRSP message to the processor interface 22 corresponding the recorded cache line state. An error or nack completion response will cause bus interface 24 to send an XRSPE (error) or XRSPN (nack) response to processor interface 22.

Noncoherent read responses will be discussed next. In one embodiment, partial read response data is accumulated into a (64)-byte noncoherent read response buffer. If an error completion response is received then an error response (XRERR) is sent to processor interface 22. Otherwise a normal response message (XURSP_DW, XURSP_QW or XURSP_BL) is sent after all SysAD transactions have completed.

Noncoherent write responses will be discussed next. In one embodiment, the R12000's SysAD Bus does not include a mechanism to acknowledge write requests. In such an embodiment, bus interface 24 issues an UWACK/WCACK to processor interface 22 as soon as the write data has been placed onto the SysAD Bus and the non-coherent write data buffer is available for reuse. It may be necessary for processor 18 to determine if all uncached stores have become globally visible (i.e., system interface device 44 has completed all uncached stores). In one embodiment, software must first issue a non-coherent read to any device 44 register location before reading the GBL_PEFRA/B register, in order to flush out any non-coherent writes in the FIFO.

Inbound SysAD requests will be discussed next. In one embodiment, inbound SysAD Bus intervention and invalidate requests are placed into the channel's eight IRA entries corresponding to the SysAD Bus request number. All intervention and invalidate requests are eventually sent to GCE 54. GCE 54 can, however, accept a maximum of one intervention or invalidate per channel. A request number FIFO keeps track of pending IRB requests which have not been sent to processor interface 22. As soon as the current invalidate/intervention request has completed the next IRB request is sent to processor interface 22.

Usually, invalidate requests are issued across the SysAD Bus as broadcast invalidates (the PI issues invalidates to both channels using SysValA and SysValB on consecutive clocks). When this happens, one of the invalidates is passed to the SysState Bus and not sent to processor interface 22. Only the invalidate which matches with the odd/even channel will be sent to processor interface 22. However, all invalidates will be placed into the IRA FIFO to insure that the state responses on the SysAD are in FIFO order.

Sometimes, however, the invalidate is directed to only one of the two channels. For example, if a processor 18 drops a shared copy of a cache line and then issues a read exclusive to that same cache line, mechanisms in the directory and PI prevent the invalidate from being issued to the originating channel (but not the, other channel). This is referred to as a directed invalidate (as opposed to a broadcast invalidate). It is important that directed invalidates be sent to the processor bus and invalidate any shared data which may still be in a processor's cache (a directed invalidate will always miss the bridge cache 112). The directed invalidate will always miss the bridge cache, but the data might be in the processor's caches (if it was shared data in the bridge cache and then replaced in the bridge cache without invalidating the processor's caches). Generally, a directed invalidate occurs when a processor has a read exclusive request outstanding for the cache line which it previously had shared in its bridge cache. A conflict will never occur between a directed invalidate and a coherent read request, because the directed invalidate's address will not match the channel's odd/even address.

Interrupt requests will be discussed next. In one embodiment, an interrupt transaction is used to generate of 5 interrupt bits (per channel). In one such embodiment, bus interface 24 keeps track of a the interrupts with a 5-bit cause register (per channel), which is updated whenever a SysAD Bus interrupt transaction occurs. Bus interface 24 sends these two 5-bit buses to processor interface 22 along with a signal which is asserted whenever any bit changes.

In one embodiment, system interface device 44 is capable of flashing the address and data cycles of all incoming partial write messages (PWR messages to PI local register space). In one such embodiment, bus interface 24 determines when an incoming PWR message is flashing and passes this information to an interface in LB 56.

Outbound SysState responses and SysAD coherency data responses will be discussed next. In one embodiment, IRSP messages occur in response to intervention requests, while IVRSP messages result in response to invalidate requests. They are similar to the VBW commands because they are issued from both banks of transaction handler 26 and/or processor interface 22, and are sent using the same communication lines (transaction handler 26 will not issue IVRSP messages).

In one embodiment, these commands perform an IRB cycle, using an IRB number, and a subsequent WRB associative look-up, using the address from the WRB. IRSP/IRSPV commands occur in pairs, with the state of the IRB keeping track of both. When the second message is received, a state response is sent to the SysState Bus and a request for the SysAD bus may occur if a coherency data response is required. If a bridge cache 112 victim is in flight (indicated by the IRSPV or IVRSPV messages), then the coherency data response may have to wait for the VBW messages to arrive.

In one embodiment, error handling on bus interface 24 (SI) is handled as shown in FIG. 13. Each error shown in FIG. 13 leads to an Error Interrupt.

A system and method for retrofitting a processor into a system 10 designed for a different processor has been described above. It should be understood that the invention can be applied to one or more processors 12 within a multiprocessor system 200 as shown in FIG. 14.

In the above discussion and in the attached appendices, the term "computer" is defined to include any digital or analog data processing unit. Examples include any personal computer, workstation, set top box, mainframe, server, supercomputer, laptop or personal digital assistant capable of embodying the inventions described herein.

Examples of articles comprising computer readable media are floppy disks, hard drives, CD-ROM or DVD media or any other read-write or read-only memory device.

Figure 15:
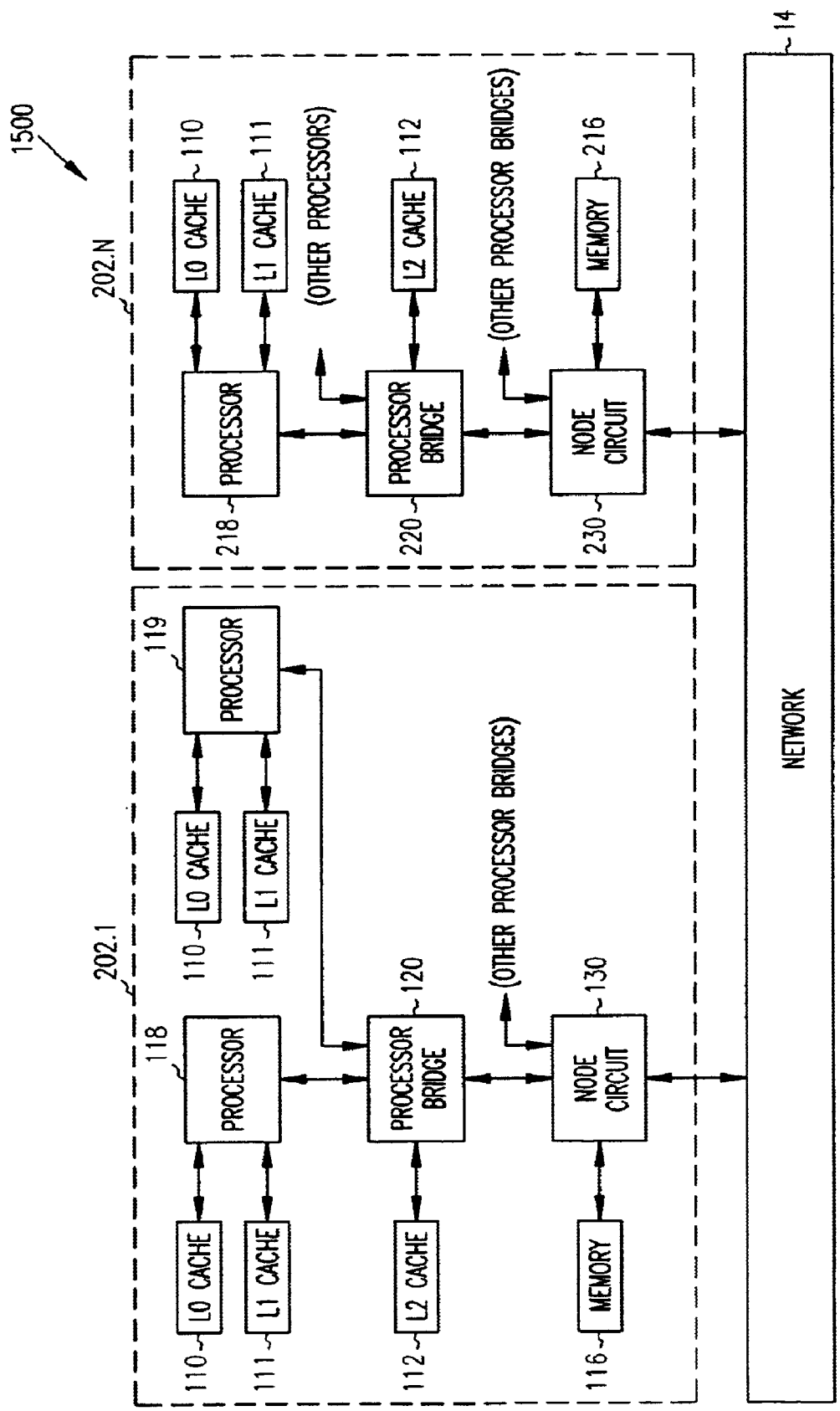
FIG. 15 shows an embodiment of the present invention, a multiprocessor computer system 200.

FIG. 15 shows one embodiment of the invention, wherein a plurality of processors 118, 119 . . . 218 (each identical to processor 18 of FIG. 1) are configured in a multiprocessor system. In some embodiments, each processor 118, 119 . . . 218 is an Itanium (TM) processor available from Intel Corporation, each having an L0 cache 110 and an L1 cache 111. Each processor bridge 120 . . . 220 is identical to processor bridge logic 20 of FIG. 1, each including an L2 cache 112. A plurality of node circuits 130 . . . 230 are provided, each having its own portion of memory 116 . . . 216, the node circuits being interconnected by network 14.

In FIG. 15, memory 16 is distributed across two or more nodes 202.1 to 202.N Each such node 202 includes a memory (116, 216) connected to a node circuit (130, 230). In one bristled node embodiment, each node circuit (130, 230) is connected to two or more processor bridge logics 120, 220. Each processor bridge logic 220 includes a bridge cache 112 as discussed above. In the embodiment shown in FIG. 15, one processor bridge logic 220 is connected to two processors (118, 119). Each processor includes a Level 0 cache 110 and a Level 1 cache 111. Bridge cache 112 therefore becomes a Level 2 cache. In another embodiment, each processor includes Levels 0–2 cache. Bridge cache 112 therefore becomes a Level 3 cache.

Also shown in FIG. 15, in some embodiments, one processor bridge logic 120 is connected to two or more processors 118, 119. Each processor (118, 119) includes a Level 0 cache 110 and a Level 1 cache 111. Bridge cache 112 therefore becomes a Level 2 cache. In another embodiment, each processor 118 includes Levels 0–2 cache. Bridge cache 112 therefore becomes a Level 3 cache. Other embodiments are also possible.

Conclusion

The present invention provides for fetching and storing (128)-byte system-level cache lines between memory 16 and L2 cache 112, and fetching and storing (64)-byte data between L2 cache 112 and L1 cache 111.

One aspect of the present invention provides a method of maintaining a cache memory in a computer system having a first processor 118, a first memory 116, and a plurality of cache levels between the first processor 118 and the first memory 116 including a first cache level 111 closer to the first processor and a second cache level 112 closer to the first memory 116. The method includes performing a first memory access to the first memory 116 by the first processor 118, storing a first cache line from the first memory 116 into the second cache level 112 and a subset of the first cache line into the first cache level 111, maintaining a cache directory associated with the first memory 116, the cache directory storing information regarding memory data that is cached, changing the subset of the first cache line in the first cache level 111, moving the changed subset of the first cache line back to the first cache line in the second cache level 112, and moving the changed first cache line to the first memory 116.

In some embodiments, the computer system further includes a second processor 218 and a second memory 216, the second memory 216 coupled to the first memory 116 such that the first processor 118 can access the second memory 216. The method further includes performing a second memory access to the second memory 216 by the first processor 118, storing a second cache line from the second memory 216 into the first cache level 112 and a subset of the second cache line into the second cache level 111 of the first processor 118, purging the second data from the second cache level 112 without purging the corresponding data from the first cache level 111, and replacing the purged second data with other data of a different memory address than the purged second data, changing the subset of the second cache line in the first cache level 111 moving the changed subset of the second cache line back to the second cache line in the second cache level 112, and moving the changed second cache line to the second memory 216.

In some embodiments, the method further includes passing the second data between the node 130 associated with first memory 116 and the node 230 associated with second memory 216 across network 14.

In some embodiments, the computer system further includes a third processor 119 coupled to the second cache level 112 of the first processor 118, the third processor 119 having an associated first cache level 111 separate from the first cache level 111 of the first processor 118. The method further includes performing a third memory access to the second memory 216 by the third processor 119, storing third data from the second memory 216 into the second cache level 112 and the first cache level 111 of the third processor 119, purging the third data from the second cache level 112 without purging the corresponding data from the first cache level 111 of the third processor, and replacing the purged third data with other data of a different memory address than the purged third data, changing the third data in the first cache level 111 of the third processor 119, and moving the changed third data back to the second memory 216.

In some embodiments of the method, the computer system further includes a snoop-based cache-coherence protocol for the first cache level and a directory-based cache-coherence protocol for the second cache, and wherein the third data and the second data form separate portions of a single cache line in the second cache level, and the method further includes performing snoop monitoring of cache activity of the third processor by the first processor, and performing snoop monitoring of cache activity of the first processor by the third processor, and updating data in the second level of cache based on the snoop monitoring.

Some embodiments of the method further include maintaining a directory-based cache coherence in the second cache level.

Another aspect of the present invention provides a computer system 1500 that includes a first processor 118, a first memory 116 coupled to the first processor 118, a plurality of cache levels between the first processor 118 and the first memory 116 including a first cache level 111 closer to the first processor 118 and a second cache level 112 closer to the first memory 116, a cache directory coupled to the second cache level 112 and associated with the first memory 216, and control circuitry operatively coupled to the second cache level 112, wherein based on the first processor 118 performing a first memory access to the first memory 116, the control circuitry stores a first cache line from the first memory 116 into the second cache level 112 and a subset of the first cache line into the first cache level 111 and maintains the cache directory, wherein the cache directory stores information regarding memory data that is cached, and after the first data in the first cache level 111 is changed, the control circuitry moves the changed subset of the first cache line back to the first cache line in the second cache level 112 and moves the changed first cache line to the first memory 116.

In some embodiments, the system 1500 further includes a second processor 218, a second memory 216 associated with the second processor 218, the second memory coupled to the first memory such that the first processor can access the second memory, wherein when the first processor performs a second memory access to the second memory, the control circuitry stores second data from the second memory into the second cache level and the first cache level, and the control circuitry also purges the second data from the second cache level without purging the corresponding data from the first cache level, and replaces the purged second data with other data of a different memory address than the purged second data, and after the second data in the first cache level is changed, the control circuitry moves the changed second data back to the second memory.

In some embodiments, the second data is passed between the first memory and the second memory across a multi processor network.

In some embodiments, the system further includes a third processor 119 coupled to the second cache level of the first processor, the third processor having an associated first cache level separate from the first cache level of the first processor, wherein when the third processor performs a third memory access to the second memory, the control circuitry stores third data from the second memory into the second cache level and the first cache level of the third processor, and the control circuitry purges the third data from the second cache level without purging the corresponding data from the first cache level of the third processor, and replaces the purged third data with other data of a different memory address than the purged third data, and after the third data in the first cache level is changed, the control circuitry moves the changed third data back to the second memory.

In some embodiments, the first processor further uses a snoop-based cache-coherence protocol for the first cache level and the control circuitry uses a directory-based cache-coherence protocol for the second cache, and wherein the third data and the second data form separate portions of a single cache line in the second cache level, wherein the first processor performs snoop monitoring of cache activity of the third processor, and the third processor performs snoop monitoring of cache activity of the first processor, and the control circuitry updates data in the second level of cache based on the snoop monitoring.

In some embodiments, the control circuitry maintains a directory-based cache coherence in the second cache level.

It is to be understood that the above description is intended to be illustrative, and not restrictive. Although numerous characteristics and advantages of various embodiments of the present invention have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled.

What is claimed is:

1. A computer system comprising:
   a first processor,
   a first memory coupled to the first processor;
   a plurality of cache levels between the first processor and the first memory including a first cache level closer to the first processor and a second cache level closer to the first memory;
   a cache directory coupled to the second cache level and associated with the first memory;
   control circuitry operatively coupled to the second cache level, wherein based on the first processor performing a first memory access to the first memory, the control circuitry stores a first cache line from the first memory into the second cache level and a subset of the first cache line into the first cache level and maintains the cache directory, wherein the cache directory stores information regarding memory data that is cached, and after the first data in the first cache level is changed, the control circuitry moves the changed subset of the first cache line back to the first cache line in the second cache level and moves the changed first cache line to the first memory;
   a second processor;
   a second memory associated with the second processor, the second memory coupled to the first memory such that the first processor can access the second memory, wherein when the first processor performs a second memory access to the second memory, the control circuitry stores a second cache line from the second memory into the first cache level and a subset of the second cache line into the second cache level, and the control circuitry also purges the second data from the second cache level without purging the corresponding data from the first cache level, and replaces the purged second data with other data of a different memory address than the purged second data, and after the subset of the second cache line in the first cache level is changed, the control circuitry moves the changed subset of the second cache line back to the second cache line in the second cache level and moves the changed second cache line to the second memory.

2. The system of claim 1, wherein the second data is passed between the first memory and the second memory across a multi processor network.

3. The system of claim 1, further comprising:
   a third processor coupled to the second cache level of the first processor, the third processor having an associated first cache level separate from the first cache level of the first processor, wherein when the third processor performs a third memory access to the second memory, the control circuitry stores third data from the second memory into the second cache level and the first cache level of the third processor, and the control circuitry purges the third data from the second cache level without purging the corresponding data from the first cache level of the third processor, and replaces the purged third data with other data of a different memory address than the purged third data, and after the third data in the first cache level is changed, the control circuitry moves the changed third data back to the second memory.

4. The system of claim 3, wherein the first processor further uses a snoop-based cache-coherence protocol for the first cache level and the control circuitry uses a directory-based cache-coherence protocol for the second cache, and wherein the third data and the second data form separate portions of a single cache line in the second cache level, wherein the first processor performs snoop monitoring of cache activity of the third processor, and the third processor performs snoop monitoring of cache activity of the first processor, and the control circuitry updates data in the second level of cache based on the snoop monitoring.

5. The system of claim 1, further comprising:
   a mechanism that maintains directory-based cache coherence for the second-level cache of the first processor; and
   a mechanism that maintains snoop-based cache coherence for the first-level cache of the first processor.

6. A computer system comprising:
   a first processor,
   a first memory coupled to the first processor;
   a plurality of cache levels between the first processor and the first memory including a first cache level closer to the first processor and a second cache level closer to the first memory;
   a cache directory coupled to the second cache level and associated with the first memory;
   control circuitry operatively coupled to the second cache level, wherein based on the first processor performing a first memory access to the first memory, the control circuitry stores a first cache line from the first memory into the second cache level and a subset of the first cache line into the first cache level and maintains the cache directory, wherein the cache directory stores information regarding memory data that is cached, and after the first data in the first cache level is changed, the control circuitry moves the changed subset of the first cache line back to the first cache line in the second cache level and moves the changed first cache line to the first memory;
   a second processor coupled to the second cache level of the first processor, the second processor having an associated first cache level separate from the first cache level of the first processor, wherein when the second processor performs a second memory access to the first memory, the control circuitry stores second data from the first memory into the second cache level and into the first cache level of the second processor, and the control circuitry purges the second data from the second cache level without purging the corresponding data from the first cache level of the second processor, and replaces the purged second data with other data of a different memory address than the purged second data, and after the second data in the first cache level is changed, the control circuitry moves the changed second data back to the first memory.

7. The system of claim 6, further comprising:

a mechanism that maintains directory-based cache coherence for the second-level cache of the first processor; and a mechanism that maintains snoop-based cache coherence for the first-level cache of the first processor.

8. A computer system comprising:

a first processor, a first memory coupled to the first processor;

a plurality of cache levels between the first processor and the first memory including a first cache level closer to the first processor and a second cache level closer to the first memory, cache control circuitry, wherein based on the first processor performing a first memory access to the first memory, the control circuitry stores first data from the first memory into the second cache level and the first cache level;

means for transferring cache lines of a first size between the first memory and the second cache level, and transferring cache lines of a second size between the second cache level and the first cache level, the second size being smaller than the first size;

a second processor;

a second memory, the second memory coupled to the first memory such that the first processor can access the second memory, wherein based on the first processor performing a second memory access to the second memory, the cache control circuitry moves second data from the second memory into the first cache level and the second cache level; and means for purging the second data from the second cache level without purging the corresponding data from the first cache level, and replacing the purged second data with other data of a different memory address than the purged second data and after the second data in the first cache level is changed, for moving the changed second data back to the second memory.

9. The system of claim 8, further comprising:

a third processor coupled to the second cache level of the first processor, the third processor having an associated first cache level separate from the first cache level of the first processor, wherein based on the third processor performing a third memory access to the second memory, the cache control circuitry moves third data from the second memory into the first cache level and the second cache level; and means for purging the third data from the second cache level without purging the corresponding data from the first cache level of the third processor, and replacing the purged third data with other data of a different memory address than the purged third data, and after the third data in the first cache level is changed, for moving the changed third data back to the second memory.

10. A computer system comprising:

a first processor, a first memory coupled to the first processor;

a plurality of cache levels between the first processor and the first memory including a first cache level closer to the first processor and a second cache level closer to the first memory, cache control circuitry, wherein based on the first processor performing a first memory access to the first memory, the control circuitry stores first data from the first memory into the second cache level and the first cache level;

means for transferring cache lines of a first size between the first memory and the second cache level, and transferring cache lines of a second size between the second cache level and the first cache level, the second size being smaller than the first size;

a second processor coupled to the second cache level of the first processor, the second processor having an associated first cache level separate from the first cache level of the first processor, wherein based on the second processor performing a second memory access to the first memory, the cache control circuitry moves second data from the first memory into the first cache level and the second cache level; and means for purging the second data from the second cache level without purging the corresponding data from the first cache level of the second processor, and replacing the purged second data with other data of a different memory address than the purged second data, and after the second data in the first cache level is changed, for moving the changed second data back to the first memory.

11. The system of claim 10, further comprising:

means for maintaining directory-based cache coherence for the second-level cache of the first processor; and means for maintaining snoop-based cache coherence for the first-level cache of the first processor.

12. A method of maintaining a cache memory in a computer system having a first processor, a first memory and a plurality of cache levels between the first processor and the first memory including a first cache level closer to the first processor and a second cache level closer to the first memory, wherein the computer system further includes a second processor and a second memory, the second memory coupled to the first memory such that the first processor can access the second memory, the method comprising:

performing a first memory access to the first memory by the first processor;

storing a first cache line from the first memory into the second cache level and a subset of the first cache line into the first cache level;

maintaining a cache directory associated with the first memory, the cache directory storing information regarding memory data that is cached;

changing the subset of the first cache line in the first cache level;

moving the changed subset of the first cache line back to the first cache line in the second cache level;

moving the changed first cache line to the first memory;

performing a second memory access to the second memory by the first processor;

storing a second cache line from the second memory into the second cache level and a subset of the second cache line into the first cache level;

purging the second data from the second cache level without purging the corresponding data from the first cache level, and replacing the purged second data with other data of a different memory address than the purged second data;

changing the subset of the second cache line in the first cache level; and moving the changed subset of the second cache line back to the second cache line in the second cache level; and moving the changed second cache line to the second memory.

13. The method of claim 12, further comprising:

passing the second data between the second cache level and the second memory across a multiprocessor network.

14. The method of claim 12, further comprising:

maintaining directory-based cache coherence for the second-level cache of the first processor; and maintaining snoop-based cache coherence for the first-level cache of the first processor.

15. The method of claim 12, wherein the computer system further includes a third processor coupled to the second cache level of the first processor, the third processor having an associated first cache level separate from the first cache level of the first processor, the method further comprising:

performing a third memory access to the second memory by the third processor;

storing third data from the second memory into the first memory, the second cache level and the first cache level of the third processor;

purging the third data from the second cache level without purging the corresponding data from the first cache level of the third processor, and replacing the purged third data with other data of a different memory address than the purged third data;

changing the third data in the first cache level of the third processor; and moving the changed third data back to the second memory.

16. The method of claim 15, wherein the computer system further includes a snoop-based cache-coherence protocol for the first cache level and a directory-based cache-coherence protocol for the second cache, and wherein the third data and the second data form separate portions of a single cache line in the second cache level, the method further comprising:

performing snoop monitoring of cache activity of the third processor by the first processor, and performing snoop monitoring of cache activity of the first processor by the third processor; and updating data in the second level of cache based on the snoop monitoring.

17. The method of claim 15, further comprising:

maintaining directory-based cache coherence for the second-level cache of the first processor; and maintaining snoop-based cache coherence for the first-level cache of the first processor.

18. A method of maintaining a cache memory in a computer system having a first processor, a first memory, and a plurality of cache levels between the first processor and the first memory including a first cache level closer to the first processor and a second cache level closer to the first memory, wherein the computer system further includes a third processor coupled to the second cache level of the first processor, the third processor having an associated first cache level separate from the first cache level of the first processor, the method further comprising:

performing a first memory access to the first memory by the first processor;

storing a first cache line from the first memory into the second cache level and a subset of the first cache line into the first cache level;

maintaining a cache directory associated with the first memory, the cache directory storing information regarding memory data that is cached;

changing the subset of the first cache line in the first cache level;

moving the changed subset of the first cache line back to the first cache line in the second cache level;

moving the changed first cache line to the first memory;

performing a second memory access to the first memory by the second processor;

storing second data from the first memory into the second cache level and into the first cache level of the second processor;

purging the second data from the second cache level without purging the corresponding data from the first cache level of the second processor, and replacing the purged second data with other data of a different memory address than the purged second data;

changing the second data in the first cache level of the second processor; and moving the changed second data back to the first memory.

* * * * *

UNITED STATES PATENT AND TRADEMARK OFFICE
CERTIFICATE OF CORRECTION

PATENT NO. : 6,751,705 B1
DATED : June 15, 2004
INVENTOR(S) : Solomon et al.

It is certified that error appears in the above-identified patent and that said Letters Patent is hereby corrected as shown below:

Title page,
Item [75], Inventors, delete "Perry" and insert -- Parry --, therefor.

Column 24,
Line 39, delete "second-level cache" and insert -- second cache level --, therefor.
Line 43, delete "first-level cache" and insert -- first cache level --, therefor.

Column 25,
Line 17, delete "second-level cache" and insert -- second cache level --, therefor.
Line 21, delete "first-level cache" and insert -- first cache level --, therefor.

Column 26,
Line 40, delete "second-level cache" and insert -- second cache level --, therefor.
Line 42, delete "first-level cache" and insert -- first cache level --, therefor.

Column 27,
Line 22, delete "second-level cache" and insert -- second cache level --, therefor.
Lines 23-24, delete "first-level cache" and insert -- first cache level --, therefor.

Signed and Sealed this

Thirty-first Day of August, 2004

JON W. DUDAS
*Director of the United States Patent and Trademark Office*